(12) United States Patent
Kim et al.

(10) Patent No.: US 12,219,615 B2
(45) Date of Patent: Feb. 4, 2025

(54) APPARATUS AND METHOD FOR RANDOM ACCESS PROCEDURE IN WIRELESS COMMUNICATION SYSTEM

(71) Applicant: Samsung Electronics Co., Ltd., Suwon-si (KR)

(72) Inventors: Youngbum Kim, Suwon-si (KR); Hosung Kim, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 17/625,021

(22) PCT Filed: Jul. 6, 2020

(86) PCT No.: PCT/KR2020/008817
§ 371 (c)(1),
(2) Date: Jan. 5, 2022

(87) PCT Pub. No.: WO2021/006588
PCT Pub. Date: Jan. 14, 2021

(65) Prior Publication Data
US 2022/0287107 A1 Sep. 8, 2022

(30) Foreign Application Priority Data
Jul. 5, 2019 (KR) .......................... 10-2019-0081548

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS 11,166,319 B2 * 11/2021 Loehr .................. H04W 76/11
2010/0041428 A1   2/2010 Chen et al.
(Continued)

FOREIGN PATENT DOCUMENTS

KR  10-2019-0013624 A   2/2019
WO  2020/088652 A1      5/2020

OTHER PUBLICATIONS

Qualcomm Incorporated; Channel Structure for Two-Step RACH; 3GPP TSG-RAN WG1 Meeting #96Bis; R1-1904992; Apr. 12, 2019, Xi'an, China.
(Continued)

*Primary Examiner* — Nguyen H Ngo
(74) *Attorney, Agent, or Firm* — Jefferson IP Law, LLP

(57) ABSTRACT

The present disclosure relates to a 5th generation (5G) or pre-5G communication system for supporting a higher data transfer rate than a 4th generation (4G) communication system such as long term evolution (LTE). According to various embodiments of the present disclosure, a method performed by a terminal in a wireless communication system may comprise the steps of: determining whether a reference signal received power (RSRP) of a reference for downlink path loss is equal to or greater than a threshold value; if the RSRP is greater than the threshold value, setting a random access type to 2-step random access; and if the RSRSP is not greater than the threshold value, setting the random access type to 4-step random access.

20 Claims, 20 Drawing Sheets

(51) Int. Cl.
  *H04W 72/0453*  (2023.01)
  *H04W 72/23*  (2023.01)
  *H04W 74/00*  (2009.01)
  *H04W 74/08*  (2009.01)

(52) U.S. Cl.
  CPC ......... *H04W 72/23* (2023.01); *H04W 74/004* (2013.01); *H04W 74/0866* (2013.01)

(56) References Cited

U.S. PATENT DOCUMENTS

| | | | |
|---|---|---|---|
| 2019/0037605 A1 | 1/2019 | Agiwal et al. | |
| 2019/0261234 A1* | 8/2019 | Park | H04W 36/28 |
| 2020/0146069 A1* | 5/2020 | Chen | H04W 76/18 |
| 2021/0219349 A1* | 7/2021 | Huang | H04W 74/0833 |

OTHER PUBLICATIONS

OPPO; Rach initialization and resource selection for 2-step Rach; 3GPP TSG-RAN WG2 Meeting #106 R2-1905601 May 17, 2019, Reno, USA.
Vivo; Selection Between 2-step and 4-step RACH; 3GPP TSG-RAN WG2 Meeting #106 R2-1905653; May 17, 2019, Reno, USA.
Ericsson; Back-off for 2-step RA; 3GPP TSG-RAN WG2 #106 Tdoc R2-1906955; May 17, 2019, Reno, USA.
Indian Office Action dated Dec. 27, 2023, issued in Indian Patent Application No. 202247006039.
European Search Report dated Jun. 30, 2022, issued in European Application No. 20837396.9.
European Office Action dated May 24, 2024, issued in European Patent Application No. 20837396.9.

\* cited by examiner

APPARATUS AND METHOD FOR RANDOM ACCESS PROCEDURE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/008817, filed on Jul. 6, 2020, which is based on and claimed priority of a Korean patent application number 10-2019-0081548, filed on Jul. 5, 2019, in the Korean Intellectual Property Office disclosure of which is incorporated by reference herein in its entirety.

BACKGROUND ART

The disclosure relates generally to a wireless communication system and, more particularly, to an apparatus and a method for a random access procedure in a wireless communication system.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" communication system or a "Post long term evolution (Post LTE)" system.

The 5G communication system is considered to be implemented in higher frequency (mmWave) bands (e.g., 28 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A terminal may perform a random access procedure for accessing a network. At this time, the terminal may be required to perform a more efficient random access procedure to reduce signaling overhead and increase power efficiency. In response thereto, a scheme of simplifying the random access procedure is being discussed.

DISCLOSURE OF INVENTION

Technical Problem

Based on the discussion, the disclosure provides an apparatus and a method for efficiently performing random access according to embodiments of the disclosure in a wireless communication system.

The disclosure provides an apparatus and a method for providing a configuration related to a 2-step random access channel (RACH) according to various embodiments of the disclosure in a wireless communication system.

The disclosure provides an apparatus and a method for transmitting a message for a 2-step RACH according to various embodiments of the disclosure in a wireless communication system.

The disclosure provides an apparatus and a method for retransmitting a message in a 2-step RACH procedure according to various embodiments of the disclosure in a wireless communication system.

The disclosure provides an apparatus and a method for retransmitting a physical uplink shared channel (PUSCH) of a 2-step RACH according to various embodiments of the disclosure in a wireless communication system.

The disclosure provides an apparatus and a method for initiating a 2-step RACH according to various embodiments of the disclosure in a wireless communication system.

The disclosure provides an apparatus and a method for performing fallback from a 4-step RACH procedure to a 2-step RACH procedure according to various embodiments of the disclosure in a wireless communication system.

The disclosure provides an apparatus and a method for a 2-step RACH procedure according to various embodiments of the disclosure in a wireless communication system.

According to various embodiments of the disclosure, a method performed by a terminal in a wireless communication system includes determining whether a reference signal received power (RSRP) of downlink path loss is larger than equal to a threshold value, configuring a random access type as 2-step random access if the RSRP is larger than or equal to the threshold value, and configuring the random access type as 4-step random access if the RSRP is not larger than the threshold value.

According to various embodiments of the disclosure, method performed by a BS in a wireless communication system include generating configuration information for 2-step random access, and transmitting the configuration information to a terminal through radio resource control (RRC) signaling, wherein the configuration information includes information a first value of a threshold value corresponding to a supplementary uplink (SUL) and a second value of the threshold value corresponding to a normal uplink (NUL), and the threshold value is used to determine whether the random access type is 2-step random access or 4-step random access through comparison with a reference signal received power (RSRP) of downlink path loss.

According to various embodiments of the disclosure, a terminal in a wireless communication system includes at least one transceiver and at least one processor, wherein the at least one processor is configured to configure a random access type as 2-step random access if the reference signal received power (RSRP) of downlink path loss is larger than or equal to the threshold value and configure the random access type as 4-step random access if the RSRP is not larger than the threshold value.

According to various embodiments of the disclosure, a terminal in a wireless communication system includes at least one transceiver and at least one processor, wherein the at least one processor is configured to generate configuration information for 2-step random access and transmit the configuration information to a terminal through radio resource control (RRC) signaling, the configuration information includes a first value of a threshold value corresponding to a supplementary uplink (SUL) and a second value of the threshold value corresponding to a normal uplink (NUL), and the threshold value is used to determine whether a random access type is the 2-step random access or the 4-step random access through a comparison with a reference signal received power (RSRP) of downlink path loss.

According to various embodiments of the disclosure, a method performed by a terminal in a wireless communication system includes receiving configuration information for a random access procedure from a BS, transmitting a first message including a first part related to a physical uplink access channel (PRACH) and a second part related to a physical uplink shared channel (PUSCH) to the BS, and receiving a second message indicating an identifier of a random access preamble included in the first part from the BS, wherein the second message indicates whether decoding of the second part is successful.

According to various embodiments of the disclosure, an apparatus of a terminal in a wireless communication system includes at least one transceiver and at least one processor connected to the at least one transceiver, wherein the at least one processor is configured to receive configuration information for a random access procedure from a BS, transmit a first message including a first part related to a physical uplink access channel (PRACH) and a second part related to a physical uplink shared channel (PUSCH) to the BS, and receive a second message indicating an identifier of a random access preamble included in the first part from the BS, and the second message indicates whether decoding of the second part is successful.

An apparatus and a method according to various embodiments of the disclosure allow the terminal to more efficiently access the network by performing the 2-step RACH procedure.

Advantageous effects obtainable from the disclosure may not be limited to the above-mentioned effects, and other effects which are not mentioned may be clearly understood, through the following descriptions, by those skilled in the art to which the disclosure pertains.

BEST MODE FOR CARRYING OUT THE INVENTION

Figure 1:
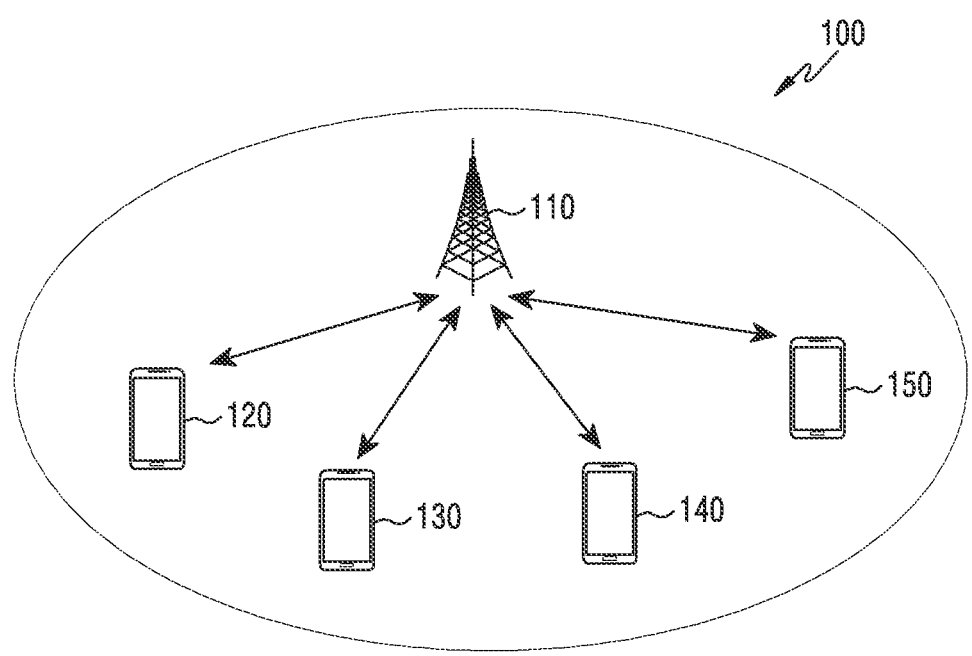
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure relates to an apparatus and a method for performing a random access procedure in a wireless communication system. Specifically, the disclosure describes a technology for performing a random access procedure through 2-step signaling instead of a random access procedure through the existing 4-step signaling in a wireless communication system.

The term (for example, message, information, preamble, or signal) referring to a signal, the term (for example, symbol, slot, subframe, radio frame, subcarrier, resource element (RE), resource block (RB), bandwidth part (BWP), or occasion) referring to resources, the term referring to a channel, the term referring to control information, the term referring to network entities, and the term referring to an element of a device, used in the following description are only examples for convenience of description. Accordingly, the disclosure is not limited to the following terms and other terms having the same technical meaning may be used.

Further, in the disclosure, the expressions "larger than" or "smaller than" may be used to indicate whether a specific condition is satisfied or fulfilled, but are used only to indicate examples, and do not exclude "larger than or equal to" or "equal to or smaller than" A condition indicating "larger than or equal to" may be replaced with "larger than", a condition indicating "equal to or smaller than" may be replaced with "smaller than", a condition indicating "larger than or equal to and smaller than" may be replaced with "larger than and equal to and smaller than".

The disclosure describes various embodiments using the terms used in some communication standards (for example, 3rd-generation partnership project (3GPP)), but this is only an example. Various embodiments of the disclosure may be easily modified and applied to other communication systems.

FIG. 1 illustrates a wireless communication system according to various embodiments of the disclosure. FIG. 1 illustrates a BS 110, a terminal 120, and a terminal 130 as parts of nodes using a radio channel in a wireless communication system. Although FIG. 1 illustrates only one BS, another BS that is the same as or similar to the BS 110 may be further included.

The BS 110 is a network infrastructure element that provides radio access to the terminals 120 and 130. The BS 110 has coverage defined in a predetermined geographical area on the basis of the range within which a signal can be transmitted. The BS 110 may be referred to as an "access point (AP)", an "eNodeB (eNB)", a "$5^{th}$-generation (5G) node", a "gNodeB (next generation node B (gNB))", a "wireless point", or a "transmission/reception point (TRP)", or using another term having a technical meaning equivalent thereto, as well as "base station".

Each of the terminal 120, the terminal 130, the terminal 140, and the terminal 150 is a device used by a user, and communicates with the BS 110 through a radio channel. According to occasions, at least one of the terminal 120, the terminal 130, the terminal 140, and the terminal 150 may be operated without involvement of the user. That is, at least one of the terminal 120, the terminal 130, the terminal 140, and the terminal 150 is a device that performs machine-type communication (MTC), and may not be carried by the user. Each of the terminal 120, the terminal 130, the terminal 140, and the terminal 150 may be referred to as a "user equipment (UE)", "mobile station", "subscriber station", "remote terminal", "wireless terminal", or "user device", or using another term having an equivalent technical meaning, as well as "terminal".

At this time, in order to increase a channel gain, the BS 110, the UE 120, and the UE 130 may perform beamforming. The beamforming may include transmission beamforming and reception beamforming. That is, the BS 110, the terminal 120, the terminal 130, the terminal 140, and the terminal 150 may assign directivity to a transmission signal or a reception signal. To this end, the BS 110 and the terminals 120 and 130 may select serving beams through a beam search procedure or a beam management procedure. After the serving beams are selected, communication may be performed through resources having a quasi co-located (QCL) relationship with resources through which the serving beams are transmitted. For example, at least some of the terminal 120, the terminal 130, the terminal 140, and the terminal 150, and the BS 110 may transmit and receive a wireless signal in an millimeter wave (mmWave) band (for example, 28 GHz, 30 GHz, 38 GHz, or 60 GHz).

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

The terminal 120 may perform a synchronization process and a cell search procedure through a primary synchronization signal (PSS), a secondary synchronization signal (SSS), and a physical broadcast channel (PBCH). Thereafter, the terminal 120 may perform a random access procedure in order to complete access to a network through the BS 110. The terminal 120 may transmit a preamble through a physical random access channel (PRACH) and receive a response message for the preamble through a physical downlink control channel (PCCH) and a physical downlink shared channel (PDSCH). The terminal performing the above-described procedure may receive a PDCCH/PDSCH and transmit a physical uplink shared channel (PUSCH)/physical uplink control channel (PUCCH) as a general uplink/downlink signal transmission procedure. The random access procedure may be used for various purposes such as initial access, uplink synchronization control, resource allocation, and handover.

The random access procedure may be divided into contention-based random access and contention-free random access. In the contention-based random access, the terminal may randomly select an RACH preamble sequence. Accordingly, a plurality of terminals (for example, the terminals 120 and 130) can transmit the same RACH preamble sequence, and thus a contention resolution process may be required. Hereinafter, in the random access procedure according to various embodiments of the disclosure, contention-based random access is described as an example but the similar configuration may also be applied to the contention-free random access procedure.

Figure 2:
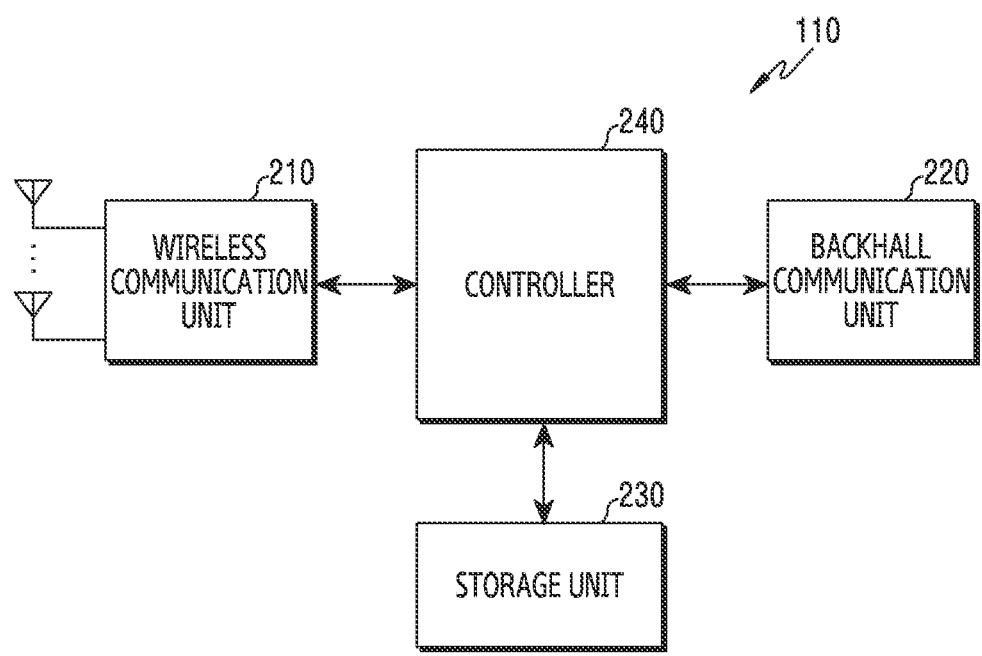
FIG. 2 illustrates a functional configuration of a BS in a wireless communication system according to various embodiments of the disclosure.

FIG. 2 illustrates a functional configuration of a BS in a wireless communication system according to various embodiments of the disclosure. The configuration illustrated in FIG. 2 may be understood as the configuration of the BS 110. The term "~unit" or "——~er" used hereinafter may refer to the unit for processing at least one function or operation and may be implemented in hardware, software, or a combination of hardware and software.

Referring to FIG. 2, the BS 110 includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. For example, in data transmission, the wireless communication unit 210 may encode and modulate a transmission bitstream to generate complex symbols. In data reception, the wireless communication unit 210 reconstructs a reception bitstream by demodulating and decoding a baseband signal.

The wireless communication unit 210 up-converts a baseband signal into a radio-frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), and an analog-to-digital convertor (ADC). Further, the wireless communication unit 210 may include a plurality of transmission/reception paths. In addition, the wireless communication unit 210 may include at least one antenna array including a plurality of antenna elements.

On the hardware side, the wireless communication unit 210 may include a digital unit and an analog unit, and the analog unit may include a plurality of sub-units according to operating power and operating frequency. The digital unit may be implemented by at least one processor (for example, a digital signal processor (DSP)).

The wireless communication unit 210 transmits and receives a signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS 110 to another node, for example, another access node, another BS, or a core network, into a physical signal, and converts a physical signal received from another node into a bitstream.

The storage unit 230 stores data such as a basic program, an application, and configuration information for the operation of the BS 110. The storage unit 230 may include volatile memory, nonvolatile memory, or a combination of volatile memory and nonvolatile memory. The storage unit 230 provides stored data in response to a request from the controller 240.

The controller 240 controls the overall operations of the BS 110. For example, the controller 240 transmits and receives a signal through the wireless communication unit 210 or the backhaul communication unit 220. The controller 240 records data in the storage unit 230 and reads the same. The controller 240 may perform the functions of a protocol stack required according to communication standards. According to another implementation, the protocol stack may be included in the wireless communication unit 210. To this end, the controller 240 may include at least one processor.

According to various embodiments, the controller 240 may control the BS 110 to perform operations according to various embodiments described below.

Figure 3:
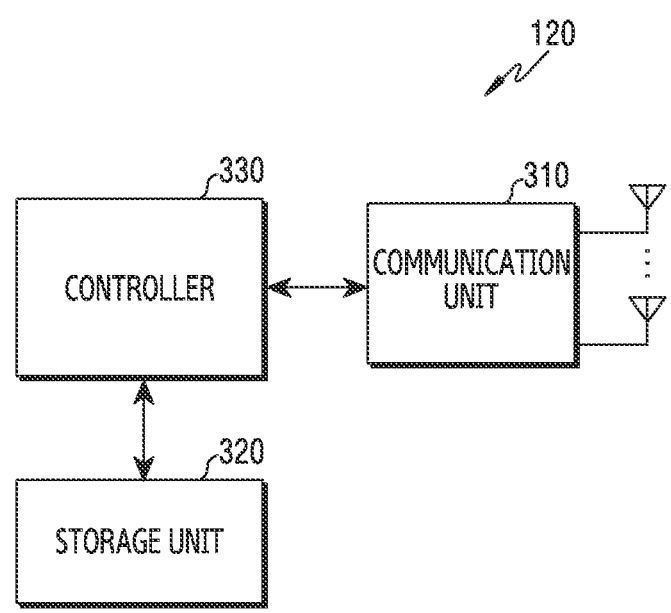
FIG. 3 illustrates a functional configuration of a UE in a wireless communication system according to various embodiments of the disclosure.

FIG. 3 illustrates a functional configuration of a UE in a wireless communication system according to various embodiments of the disclosure. The configuration illustrated in FIG. 3 may be understood as the configuration of the terminal 120. The term "~unit" or "~er" used hereinafter may refer to the unit for processing at least one function or operation and may be implemented in hardware, software, or a combination of hardware and software.

Referring to FIG. 3, the UE includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. For example, in data transmission, the communication unit 310 encodes and modulates a transmission bitstream to generate complex symbols. In data reception, the communication unit 310 reconstructs a reception bitstream by demodulating and decoding a baseband signal. Further, the communication unit 310 up-converts a baseband signal to an RF band signal, transmits the RF band signal through an antenna, and then down-converts the RF band signal received through the antenna to the baseband signal. For example, the communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit (for example, a radio frequency integrated circuit (RFIC)). The digital circuit and the analog circuit may be implemented as one package. The communication unit 310 may include a plurality of RF chains. The communication unit 310 may perform beamforming.

The communication unit 310 may include different communication modules for processing signals in different frequency bands. The communication unit 310 may include a plurality of communication modules for supporting a plurality of different radio access technologies. For example, the different radio access technologies may include Bluetooth low energy (BLE), wireless fidelity (Wi-Fi), Wi-Fi Gigabyte (WiGig), and cellular network (for example, long-term evolution (LTE)). Further, different frequency bands may include a Super High Frequency (SHF) (for example, 2.5 GHz and 5 Ghz) band and a millimeter (mm) wave (for example, 60 GHz) band.

The communication unit 310 transmits and receives a signal as described above. Accordingly, all or some of the communication unit 310 may be referred to as a "transmitter", a "receiver", or a "transceiver". In the following description, transmission and reception performed through a radio channel are used to have a meaning including the processing performed by the communication unit 310.

The storage unit 320 stores data such as a basic program, an application, and configuration information for the operation of the terminal. The storage unit 320 may include volatile memory, nonvolatile memory, or a combination of volatile memory and nonvolatile memory. The storage unit 320 provides stored data in response to a request from the controller 330.

The controller 330 controls the overall operation of the terminal. For example, the controller 330 transmits and receives a signal through the communication unit 310. The controller 330 records data in the storage unit 320 and reads the same. The controller 330 may perform the functions of a protocol stack required by the communication standard. To this end, the controller 330 may include at least one processor or microprocessor, or may be a part of the processor. Further, the part of the communication unit 310 or the controller 330 may be referred to as a communications processor (CP). According to various embodiments, the controller 330 may control the UE to perform operations according to various embodiments described below.

The terminal may perform a random access procedure to access the network. In contention-based random access, the terminal may perform the random access procedure through the following 4-step signaling. Signals and message transmitted in steps 1 to 4 may be referred to as Msg 1, Msg 2, Msg 3, and Msg 4, respectively.

Step 1: the terminal may transmit a random access preamble (RAP). The preamble may be transmitted through a PRACH.

Step 2: the terminal may receive the random access response (RAR). The RAR may be transmitted through a PDCCH and a PDSCH.

Step 3: the terminal may transmit a message including identity of the UE. The message may be transmitted through a PUSCH.

Step 4: the terminal may receive a contention resolution message.

Through 4-step signaling, the terminal may attempt stable access, but a more simplified random access procedure is being discussed to reduce signaling overhead and minimize latency.

Hereinafter, various embodiments of the disclosure describe a scheme in which the terminal accesses the network through the random access procedure (hereinafter, 2-step RACH procedure) performed through 2-step signaling unlike the random access procedure (hereinafter, 4-step RACH procedure) performed through the existing 4-step signaling. The terminal may perform the random access procedure through the following 2-step signaling. The message transmitted in step 1 may be referred to as Msg A, and the message transmitted in step 2 may be referred to as Msg B.

Step 1: the terminal may transmit a message making a request for a connection to the network. According to various embodiments, the request message may include a random access preamble and an identifier of the terminal.

Step 2: the terminal may receive a response message from the BS. According to various embodiments, the response message may be a contention resolution message that accepts the connection request or a message making a request for retransmission due to decoding failure.

Hereinafter, configuration information required for performing the 2-step RACH procedure, information included in Msg A and Msg B, other information related to the 2-step RACH, and operations will be described with reference to FIG. 4.

Figure 4:
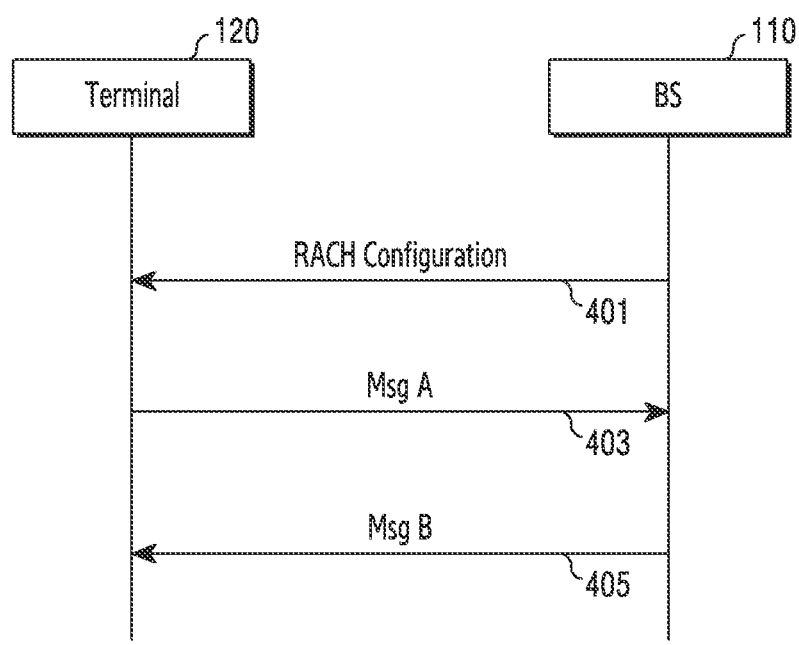
FIG. 4 illustrates signaling for performing a 2-step random access channel (RACH) procedure in a wireless communication system according to various embodiments of the disclosure.

FIG. 4 illustrates signaling for performing a 2-step random access channel (RACH) procedure in a wireless communication system according to various embodiments of the disclosure. The 2-step RACH procedure is a procedure to simultaneously reduce signaling overhead and access delay by using message A (Msg A) instead of Msg 1 and Msg 3 of the 4-step RACH procedure transmitted from the terminal 120 to the BS 110 and message B (Msg B) instead of Msg 2 and Msg 4 of the 4-step RACH procedure transmitted from the BS 110 to the terminal 120.

Referring to FIG. 4, in operation 401, the BS 110 may transmit configuration information to the terminal 120. Before performing the 2-step RACH procedure, parameters related to the 2-step RACH may be configured. The configuration information may include parameters related to random access. In some embodiments, the configuration information may be transmitted through a master information block (MIB). In some embodiments, the configuration information may be transmitted through a system information block (SIB). For example, the SIB may be SIB 1. In another example, the SIB may be SIB 2. The configuration information may include at least one piece of information related to transmission of message A in operation 403 and information related to reception of message B in operation 405.

In operation 403, the terminal 120 may transmit message A to the BS 120. Message A may include 2 parts. A first part of message A may include a random access preamble. The first part of message A may be transmitted in a physical random access channel (PRACH). The terminal 120 may generate a random access preamble and transmit the generated random access preamble through the PRACH.

A second part of message A may include control information for access to the network. The second part of message A may include an identifier of the terminal 120. The second part of message A may be transmitted in a physical uplink shared channel (PUSCH). For example, if a cell-radio temporary network identifier (C-RNTI) is allocated to the terminal, the second part of message A may include the C-RNTI. In another example, if there is no RNTI allocated to the terminal, the second part of message A may include a unique ID of the terminal. For example, the unique ID of the terminal may be randomly selected by the terminal within a preset range. The terminal 120 may transmit a payload corresponding to the second part through the PUSCH.

The terminal 120 may transmit message A on the basis of configuration information. In some embodiments, the terminal 120 may transmit message A including a random access preamble identified on the basis of the configuration information. The configuration information may include a parameter related to generation of the random access preamble of message A. In some embodiments, the terminal 120 may transmit message A through resources according to the configuration information. The configuration information may include a parameter related to resources through which at least one of the first part or the second part of message A is transmitted. Further, in some embodiments, the terminal 120 may transmit message A according to power configured on the basis of the configuration information. The configuration information may include a parameter related to power for transmitting at least one of the first part or the second part of message A.

In operation 405, the BS 110 may transmit message B to the terminal 120. The BS 110 may transmit message B in response to message A from the terminal 120. The BS 110 may decode the first part of message A and decode the second part of message A. The BS 110 may succeed in decoding both the first part and the second part and, if access attempt by the corresponding terminal 120 is allowed, may transmit message B indicating success of the access attempt through the random access preamble to the terminal 120. For example, in contention-based random access, message B may include a contention resolution identifier. The terminal 120 receiving message B may access the core network through the BS 110. Thereafter, the terminal 120 may access the network through a radio resource control (RRC) connection procedure. The terminal 120 may be in an RRC-connected state.

Meanwhile, the BS 110 may succeed in decoding the first part of message A but may fail in decoding the second part. According to various embodiments, in order to make a request for retransmit the second part, the BS 110 may transmit indication information indicating failure of decoding of the second part. The indication information may be transmitted on the basis of message B. The indication information may be transmitted in an implicitly method or an explicitly method. Although not illustrated in FIG. 4, the terminal 120 may retransmit message A to the BS 110.

Unlike in FIG. 4, if the BS 110 fails in message A decoding (for example, fails in first part (PRACH) decoding), the BS 110 may not transmit a response. According to an embodiment, thereafter, the terminal 120 may retransmit message A or perform fallback to the 4-step RACH according to non-reception of the response to message A.

As described above, in order to perform the 2-step RACH procedure, the terminal 120 is required to preferentially receive configuration information. At this time, since configuration information for the 4-step RACH procedure should also be provided to the terminal before the RRC connection, configuration information according to each random access procedure may be configured in various forms. Hereinafter, examples of the forms of random access configuration information are described. Information (or message) including at least one piece of the configuration information for the 2-step RACH procedure and the configuration information for the 4-step RACH procedure is referred to as RACH configuration information.

I. RACH Configuration Information
1. Form of RACH configuration information

The RACH configuration information may be configured in various forms. In order to describe forms of the RACH configuration information, RACH-ConfigCommon of 3GPP TS 38.331 may be referred to as an example.

In some embodiments, the RACH configuration information may separately include configuration information for the 2-step RACH procedure and configuration information for the 4-step RACH procedure. That is, the configuration information for the 2-step RACH procedure may be configured independently from the configuration information for the 4-step RACH procedure. For example, the RACH configuration information may include RACH configuration information of the 2-step RACH and PUSCH configuration information of the 2-step RACH separately from RACH-ConfigCommon for the 4-step RACH. For example, the RACH configuration information of the 2-step RACH may include at least one of parameters included in RACH-ConfigCommon for the 4-step RACH. For example, the PUSCH configuration information may include at least one of parameters included in ConfiguredGrantConfig.

In other embodiments, the RACH configuration information may include configuration information for the 2-step RACH procedure relatively defined from the configuration information for the 4-step RACH procedure. For example, the RACH configuration information may include common information for defining parameters which can be applied to the 4-step RACH procedure and the 2-step RACH procedure. In addition, the RACH configuration information may include parameters applied only to the 2-step RACH procedure and parameters applied only to the 4-step RACH procedure. The RACH configuration information may include PUSCH configuration information of the 2-step RACH. In another example, the RACH configuration information may include RACH-ConfigCommon for the 4-step RACH, and also include a separate information element (IE) for defining additionally required parameters other than the RACH-ConfigCommon. The RACH configuration information may include PUSCH configuration information of the 2-step RACH.

In other embodiments, the RACH configuration information may include only configuration information for the 2-step RACH procedure. According to an embodiment, if only the 2-step RACH is supported in a specific cell or a specific frequency band, the configuration information may include only the 2-step RACH without any parameter for the 4-step RACH.

2. Random Access-Related Parameter

Configuration information for the 2-step RACH procedure may include parameters for performing the 2-step RACH procedure. The 2-step RACH procedure may include transmission of message A and reception of message B.

A. Use of RRC Configuration Parameters
A-1 RACH-Related Parameter

Configuration information for the 2-step RACH procedure may include parameters related to transmission of message A. Transmission of message A may include PRACH transmission and PUSCH transmission. Configuration information for the 2-step RACH procedure may include transmission of the random access preamble and information related to a response thereto. In some embodiments, the configuration information for the 2-step RACH procedure may include parameters for performing functions which are the same as or similar to functions defined by the parameters (for example, Rach-ConfigCommon of 3GPP TS 38.331) for the 4-step RACH procedure. For example, the configuration information for the 2-step RACH procedure may include at least one of the following parameters.

prach2step-ConfigurationIndex: index value indicating a specific correlation in a mapping table for defining a preamble format, a frame number, a subframe number, a symbol, an RACH slot within a subframe, the number of PRACH occasions in a PRACH slot in a time domain, and correlations between PRACH durations in the 2-step RACH procedure pusch-ConfigurationIndex: index value indicating a specific correlation in a mapping table defining a location of a PUSCH slot of Msg A, the number of PUSCH occasions in a PUSCH slot, and correlations of PUSCH durations in the 2-step RACH procedure msgA-FDM: number of transmissions of Msg A that is frequency division multiplexed (FDMed) in one transmission instance. if the different numbers of PUSCHs and PRACHs are FDMed, the field may indicate the number of PRACH transmissions and the number of PUSCH transmissions FDMed in one transmission instance.

msgA-Frequencystart: offset value of msg A in a frequency domain relative to PRB 0. if the PUSCH and the PRACH are transmitted in different frequency domains, the field may indicate both an offset value of the PRACH and an offset value of the PUSCH.

zeroCorrelationZoneConfig2: indicates a cyclic shift (CS) set for preamble groups included in Msg A.

preambleReceivedTargetPower2: target power level in transmission of a random access preamble of Msg A puschReceviedTargetPower: target power level in transmission of a PUSCH of Msg A msgATransMax: maximum number of transmissions of Msg A before declare of access failure puschTransMax: maximum number of transmissions of the PUSCH of Msg A before declare of access failure. If the random access preamble of the PRACH is detected but PUSCH decoding fails, the field may indicate the maximum number of PUSCH retransmissions.

powerRampingStep1: ramping step in PRACH retransmission during the 2-step RACH procedure powerRampingStep2: ramping step in PUSCH retransmission during the 2-step RACH procedure msgB-ResponseWindow: time for which response to Msg B is waited for after Msg A is transmitted. The field may be expressed by the number of slots.

2step-ssb-perRACH-OccasionAndCB-Preambles-PerSSB: the number of SSBs per RACH occasion and the number of preambles per SSB in the 2-step RACH procedure ssb-perPUSCH-Occasion: number of SS/PBCH blocks (SSBs) per PUSCH occasion in the 2-step RACH procedure.

2step-groupBconfigured: preamble group according to the length of PUSCH payload of msg A ra2step-ContentionResolutionTimer: initial value of a contention resolution timer in the 2-step RACH procedure. If Msg A is transmitted or a PUSCH of Msg A is transmitted, the timer may start.

rsrp-ThresholdSSB-2RACH: threshold value for selecting an SSB block. The terminal may select an SSB block having an RSRP larger than the threshold value of the field. The terminal may estimate a path loss on the basis of the selected SSB. The terminal may transmit a random access preamble in an RACH occasion corresponding to the selected SSB block or transmit the PUSCH of msg A in the PUSCH occasion.

prach-RootSequenceIndex-2step: length of a sequence for generating the random access preamble of Msg A.

msgA-SubcarrierSpacing: subcarrier spacing of Msg A. If numerology of the PRACH is different from numerology of the PUSCH, the field may indicate, for example, both subcarrier spacing of the PRACH and subcarrier spacing of the PUSCH.

msgA-transformPrecoder: indicates whether a transform precoder of Msg A is used. According to an embodiment, the PRACH does not fixedly use the transform precoder, and the field may indicate only whether the transform precoder of the PUSCH is used. Further, according to an embodiment, the field may indicate whether transform precoders of the PRACH and the PUSCH are used. If a waveform of the PRACH is different from a waveform of the PUSCH, the field may indicate, for example, whether the transform precoder of the PRACH is used and the transform precoder of the PUSCH is used.

According to an embodiment, unlike the above description, at least one of the RACH occasion, the PUSCH occasion, the relation between the PRACH and the PUSCH in the time domain (for example, the number of slots and the number of symbols), each length, the preamble format, and the PUSCH payload size may be indicated through one configuration index (for example, msgA-Configurationindex) instead of "prach2step-ConfigurationIndex" and "pusch-ConfigurationIndex".

According to an embodiment, if the same value as the 4-step RACH among the parameters is shared, the corresponding parameter may be omitted in the configuration information (absent). For example, powerRampingStep1 may be omitted if the value of powerRamingStep of the 4-step RACH is shared.

A-2 PUSCH-Related Parameter

Meanwhile, message A of the 2-step RACH procedure may include PUSCH transmission. Since resource allocation for PUSCH transmission is needed before the random access preamble is transmitted, configuration information for the 2-step RACH procedure may be required to include scheduling information. In some embodiments, the configuration information for the 2-step RACH procedure may include resource allocation information (for example, ConfiguredGrantConfig of 3GPP TS 38.331) through RRC. PUSCH transmission can be performed along with DMRS transmission, and thus the configuration information for the 2-step RACH procedure may also include a configuration for the DMRS. For example, the configuration information for the 2-step RACH procedure may include at least one of the following parameters.

msgApuschfrequencyHopping: information related to frequency hopping of the PUSCH of Msg A msgApuschcg-DMRS-Configuration: configuration information for the DMRS transmitted along with the PUSCH of Msg A msgApuschmcs-Table: indicates an MCS table used for determining a modulation scheme of the PUSCH of Msg A when a transform precoder is not used. Meanwhile, according to an embodiment, the PUSCH of msg A may be fixed to a specific modulation scheme (for example, QPSK). In this case, the configuration information may not include the field.

msgApuschmcs-TableTransformPrecoder: indicates an MCS table used for determining a modulation scheme of the PUSCH of Msg A when a transform precoder is used. Meanwhile, according to an embodiment, the PUSCH of msg A may be fixed to a specific modulation scheme (for example, QPSK). In this case, the configuration information may not include the field.

msgApuschresourceAllocation: resource allocation type of the PUSCH of Msg A. According to an embodiment, the resource allocation type may be preconfigured as resource allocation type 1. In this case, the configuration information may not include the field.

msgApuschrbg-Size: size of an RBG of Msg A. Meanwhile, according to an embodiment, the field may be omitted.

msgApuschpowerControlLoopToUse: power control parameter $l \in \{\alpha 1\}$ when the PUSCH of Msg A is transmitted msgApuschp0-PUSCH-Alpha: power parameter p0 when the PUSCH of Msg A is transmitted msgApuschtransformPrecoder: whether a transform precoder of the PUSCH of Msg A is used. According to an embodiment, when whether the transform precoder of the PUSCH is used is indicated by the "msgA-transformPrecoder", the field may be omitted.

msgApuschnrofHARQ-Processes: number of HARQ processes of the PUSCH of Msg A msgApuschrepK: number of retransmissions of Msg A msgApuschrepK-RV: redundancy version (RV) sequence to be used for retransmission of Msg A msgApuschperiodicity: period of transmission of Msg A according to the corresponding configuration It has been described that each parameter of the configuration information for the 2-step RACH has an independent value, but each field may configure parameters for the 2-step RACH in the form of defining an offset value for the same parameter. For example, a threshold value for SSB selection in the 2-step RACH procedure may be indicated by a difference from a threshold value for SSB selection in the 4-step RACH procedure. For example, if the threshold value for SSB selection in the 2-step RACH procedure is 56 (larger than or equal to −85 dbm and smaller than 84 dbm) and the threshold value for SSB selection in the 4-step RACH procedure is 66 (larger than or equal to −75 dbm and smaller than 74 dbm), RACH configuration information may include a threshold value 66 for SSB selection in the 4-step RACH procedure and an offset 10 for SSB selection in the 2-step RACH procedure.

B. Parameter for Message A

According to various embodiments, configuration information for the 2-step RACH procedure may include parameters related to message A. In the 2-step RACH procedure, after transmitting a random access preamble and receiving a random access response, the terminal may attempt access to the network through transmission of message A instead of transmission of terminal identity information. Accordingly, even though the parameter related to Msg 1 of the 4-step RACH and parameters related to Msg 3 are reused, the definition of parameters specifically defined for message A may be needed.

B-1 Information Related to Relation Between PRACH and PUSCH of Message A

Transmission of message A includes both PRACH transmission and PUSCH transmission, and thus configuration information for the 2-step RACH procedure may include a parameter indicating the relation between PRACH transmission and PUSCH transmission.

In some embodiments, the configuration information for the 2-step RACH procedure may include a parameter for defining the relation between beam information (for example, a spatial domain transmission filter) used for PRACH transmission and beam information (for example, spatial domain transmission filter) used for PUSCH transmission. For example, the configuration information for the 2-step RACH procedure may include the same beam indicator. The same beam indicator may indicate the use of a beam, which is the same as a beam used for PUSCH transmission, for PRACH transmission.

Further, in some embodiments, the configuration information for the 2-step RACH procedure may include a parameter for defining the relation between PRACH transmission resources (that is, PRACH occasion) and PUSCH transmission resources (that is, PUSCH occasion). For example, the configuration information for the 2-step RACH procedure may include may include a time offset. The time offset may indicate a time interval from initiation of the PRACH transmission to initiation of the PUSCH transmission by the number of symbols or slots. For example, when PRACH transmission is initiated in a second symbol of an $i^{th}$ slot and PUSCH transmission is initiated in a ninth symbol of the $i^{th}$ slot, an offset may indicate 7 symbols. If SCS of the PRACH is different from SCS of the PUSCH, the offset may be defined on the basis of specific SCS (for example, 15 kHz). In another example, the configuration information for the 2-step RACH procedure may include a resource relation indicator. The relation indicator may indicate a specific configuration value in a mapping table that defines the relation between PRACH transmission resources and PUSCH transmission resources.

Further, in some embodiments, the configuration information for the 2-step RACH procedure may include a parameter for defining the relation between an SSB used for PRACH transmission and PUSCH transmission resources (that is, PUSCH occasion). The terminal may identify the SSB among SSBs received from the base station. The terminal transmits a random access preamble in an RACH occasion corresponding to the identified SSB. At this time, the relation between the SSB, the RACH occasion, and a preamble ID may be configured by the configuration information. The terminal may identify at least one PUSCH occasion corresponding to the selected SSB among a plurality of PUSCH occasions. The terminal may perform PUSCH transmission in the identified PUSCH occasion. According to an embodiment, if the number of identified PUSCH occasions is plural, the terminal may select one of the plurality of identified PUSCH occasions in the order of frequency-time resources or randomly.

Further, in some embodiments, the configuration information for the 2-step RACH procedure may include a parameter for defining the relation between power information of PRACH transmission and power information of PUSCH transmission. For example, the configuration information for the 2-step RACH procedure may include an offset for a target power value of PRACH transmission. In PUSCH transmission, transmission power may be calculated by applying the offset to the target power value. For example, the configuration information for the 2-step RACH procedure may include an offset for ramping information used for PRACH transmission. The ramping information may include at least one of a ramping counter and a ramping unit. For example, the configuration information for the 2-step RACH procedure may include may include a compensation factor for PRACH transmission power. Components for calculating PRACH transmission power may be different when PUSCH transmission power is calculated. For example, the PRACH and the PUSCH may have different waveforms. Further, for example, the PRACH and the PUSCH may have different SCSs.

B-2. Parameter Related to Retransmission of Message A

Transmission of message A may fail. For example, the BS may fail to receive a preamble transmitted by the terminal. At this time, the terminal cannot receive a response to message A, and thus transmits message A again. Further, for example, the BS may detect the preamble transmitted by the terminal but may fail in decoding the PUSCH of message A. At this time, since the terminal cannot normally provide the PUSCH, that is, UE identity to the BS, the terminal transmits the PUSCH again. As described above, when entire message A (that is, random access preamble and PUSCH) or the second part of message A (PUSCH and DMRS) is retransmitted, the definition of parameters for retransmission may be needed.

In some embodiments, the configuration information for the 2-step RACH procedure may include counter information indicating the number of retransmissions. The counter information may include at least one of a counter for entire message A or a counter for PUSCH transmission. When retransmissions corresponding to the number of retransmission are performed by the RRC connection is not successful, the terminal may declare access failure.

Further, in some embodiments, the configuration information for the 2-step RACH procedure may include a retransmission timer. When message B is not received for a predetermined time after message A is transmitted, the terminal may retransmit message A. The retransmission timer may run as MsgBresponseWindow.

Further, in some embodiments, the configuration information for the 2-step RACH procedure may include retransmission pattern information. The retransmission patter information may include at least one of a pattern of a redundancy version (RV) to be applied (for example, in the order of RV0, RV2, RV3, and RV1), a pattern of a DMRS to be applied (for example, in the order of increasing DMRS densities), and a pattern of an MCS level to be applied (for example, in the order of decreasing MCS levels) in PUSCH retransmission. Further, the retransmission pattern information may include a format of a random access preamble and a CP length in PRACH retransmission.

In some embodiments, the configuration information for the 2-step RACH procedure may include retransmission configuration information of message A in message A retransmission. The terminal may indicate a change in transmission-related configurations of message A to a form robust to a channel in order to increase a decoding success probability of message A in message A retransmission. For example, the retransmission configuration information may indicate QPSK as the MCS level of PUSCH transmission. Further, for example, the retransmission configuration information may indicate allocation by resource allocation type 1 of PUSCH transmission. In addition, for example, the retransmission configuration information may indicate maximum power as PUSCH transmission power. The retransmission configuration information may indicate the gradual performance at a plurality of levels in every retransmission according to a robust degree according to an embodiment.

B-3. Random access preamble for message A

In order to distinguish between a random access preamble for the 4-step RACH and a random access preamble for the 2-step RACH, the a random access preamble for the 2-step RACH may be defined. The configuration information for the 2-step RACH may include information related to the random access preamble for the 2-step RACH.

In some embodiments, the configuration information for the 2-step RACH may include information for indicating a preamble group for the 2-step RACH. For example, the configuration information for the 2-step RACH may include a specific indicator. The specific indicator may be an indicator for distinguishing the 2-step RACH and the 4-step RACH among all random access preambles (for example, 64 preambles). In the 2-step RACH procedure, informing of the size of uplink resources to be allocated through preambles in advance has a small actual profit, and thus group B of preambles may not be configured. Further, for example, among the random access preambles, preambles of a preamble group for contention-free random access may be used for random access for the 2-step RACH.

In some embodiments, the configuration information for the 2-step RACH may include preamble generation information for the 2-step RACH. For example, the generation information may include a sequence length. The preamble of the 2-step RACH may be generated to have a sequence length different from the 4-step RACH. For example, the generation information may include a cyclic shift configuration for preamble generation. If the 2-step RACH is configured, the BS may detect a random access preamble index of message A on the basis of preamble generation information of the 2-step RACH.

C. Parameter Related to Fallback to 4-Step RACH

The 2-step RACH transmits a random access-related uplink message along with a preamble, and the terminal may more quickly access the network. However, transmitting much information in the state in which uplink synchronization is not guaranteed may cause frequent transmission failure, and accordingly, the original RACH procedure, that is, the 4-step RACH procedure may be needed. Therefore, the configuration information for the 2-step RACH procedure may include parameters related to fallback to the 4-step RACH.

In some embodiments, the configuration information for the 2-step RACH procedure may include a parameter related to a conditions of fallback to the 4-step RACH. If the fallback conditions are satisfied, the terminal may switch from the 2-step RACH procedure to the 4-step RACH procedure. For example, the configuration information for the 2-step RACH procedure may include a fallback timer. The fallback timer may be initiated when the terminal initially transmits message A. When message B indicating contention resolution is not received until the fallback timer expires, the terminal may switch to the 4-step RACH procedure. For example, the configuration information for the 2-step RACH procedure may include an RSRP threshold value. If the RSRP value of the selected SSB is smaller than the threshold value, the terminal may switch to the 4-step RACH procedure. The terminal may re-measure the RSRP of the SSB whenever message A is retransmitted.

In some embodiments, the configuration information for the 2-step RACH procedure may indicate a parameter for sharing values between the 2-step RACH procedure and the 4-step RACH in fallback to the 4-step RACH. For example, the shared parameter may include a power ramping counter. The power ramping counter of the 2-step RACH may be maintained when switching to the 4-step RACH. For example, the shared parameter may be a PRACH Configuration index. In spite of the fallback to the 4-step RACH, the terminal may not change the selected SSB. The terminal may transmit a random access preamble in an RACH occasion corresponding to the same SSB index.

Although examples of the configuration information for the 2-step RACH procedure have been described with reference to FIG. 4, various embodiments are not limited thereto. In addition to the above-described parameters, random access-related parameters required for performing operations of the BS and the terminal described below may be included in the configuration information.

The terminal transmits message A on the basis of the received configuration information, and the BS transmits message B to the terminal in response to reception of message A. Transmission of message A may include PRACH transmission and PUSCH transmission, and the operations of the BS and the terminal may be defined according to whether the PRACH is detected and whether PUSCH decoding is successful. For example, the BS may detect the PRACH of message A and succeed in PUSCH decoding. In another example, the BS detects the PRACH of message A but may fail in decoding of the PUSCH of message A. In another example, the BS may not normally receive message A (that is, not detect the PRACH). Hereinafter, signaling between the BS and the terminal according to each situation, and operations of the BS or the terminal are described with reference to FIGS. 5 to 12.

Figure 5:
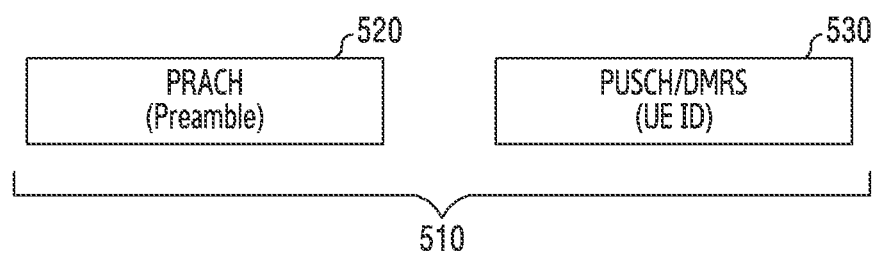
FIG. 5 illustrates an example of message A for a 2-step RACH procedure in a wireless communication system according to various embodiments of the disclosure.

FIG. 5 illustrates an example of message A 510 for a 2-step RACH procedure in a wireless communication system according to various embodiments of the disclosure.

Figure 6:
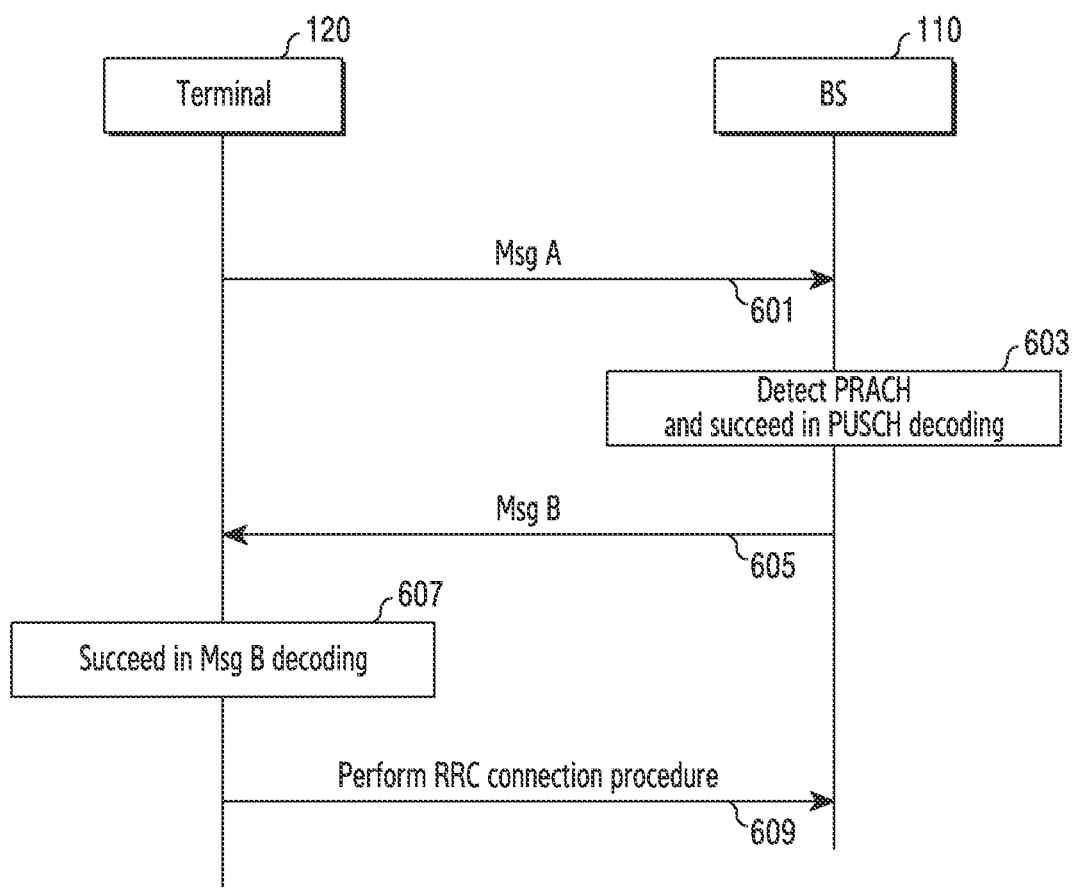
FIG. 6 illustrates an example of the 2-step RACH procedure in a wireless communication system according to various embodiments of the disclosure.

Referring to FIG. 5, message A 510 may include a first part 520 and a second part 530. The first part 520 may be related to a PRACH. The first part 510 may include a random access preamble. The random access preamble may be transmitted through the PRACH. The second part 520 may be related to a PUSCH. The second part 520 may include data transmitted through an uplink-shared channel (UL-SCH) and the PUSCH. The data may include control information related to an RRC connection request. For example, the data may include an identifier of the terminal. The identifier of the terminal may be a C-RNTI, temporary cell-RNTI (TC-RNT), a configured scheduling RNTI (CS-RNTI), or a unique ID of the terminal. PUSCH transmission may be performed together with DMRS transmission for demodulation. The second part 520 may include a DMRS.
II. Indicates PRACH Detection, PUSCH Decoding, and RA Preamble ID
1. CASE 1. PRACH Detection O and PUSCH Decoding O FIG. 6 illustrates an example of the 2-step RACH procedure in a wireless communication system according to various embodiments of the disclosure. In FIG. 6, the BS 110 detects a random access preamble of message A and succeeds in PUSCH decoding.

Referring to FIG. 6, in operation 601, the terminal 120 may transmit message A to the BS 110. Transmission of message A may include PRACH transmission and PUSCH transmission. The PRACH transmission may include transmission of a random access preamble. The PUSCH transmission may include transmission a terminal identifier. In addition, transmission of message A may include DMRS transmission in order to demodulate PUSCH transmission.

In operation 603, the BS 110 may detect the random access preamble of the PRACH and successfully decode the PUSCH. The BS 110 may attempt detection of the random access preamble through a correlation operation. The BS 110 may attempt PUSCH decoding when the random access preamble is detected. The BS 110 may perform PUSCH decoding on the basis of DMRSs received from the terminal. The BS 110 may identify success of the PUSCH decoding. The BS 110 may acquire the identifier of the terminal 120 included in the PUSCH. The identifier of the terminal 120 may be a C-RNTI, a TC-RNTI, a CS-RNTI, or a unique ID of the terminal 120. The BS 110 may determine whether to allow the RRC connection for the corresponding terminal 120 on the basis of the identifier of the terminal That is, the BS 110 may determine whether contention resolution is achieved.

In operation 605, the BS 110 may transmit message B to the terminal. When the BS 110 allows the RRC connection for the terminal 120, the BS may transmit message B including an RRC connection setup message. Transmission of message B may include PDCCH transmission and PDSCH transmission. The PDCCH of message B may include scheduling information for PDSCH transmission of Msg B. That is, message B may include downlink control information (DCI) and data according to the DCI. For example, the DCI may be configured in DCI format 1_0, and may be cyclic redundancy check (CRC)-scrambled by one of a C-RNTI, a TC-RNTI, and a random access-RNTI (RA-RNTI). The data according to the DCI may include information related to the RRC connection setup. According to an embodiment, message B may include an identifier for contention resolution.

In operation 607, the terminal 120 may successfully decode message B. The terminal 120 may acquire DCI by decoding the PDCCH of message B. The terminal 120 may decode the PDSCH from the DCI. The terminal 120 may be aware of success of PUSCH transmission by receiving message B. When the terminal 120 successfully receive and decode message B, the RACH procedure may be terminated.

In operation 609, the terminal 210 may perform an RRC connection procedure. The terminal 120 may transmit a message indicating completion of the RRC connection to the BS 110 according to an RRC connection request message.

As illustrated in FIG. 6, the BS 110 may detect the PRACH of message A and perform PUSCH decoding. PRACH transmission may indicate an ID of the random access preamble used by the terminal. The BS 110 may detect the ID of the random access preamble used by the terminal on the basis of the correlation operation. PUSCH transmission may provide the ID of the terminal to the BS 110. The BS 110 may generate message B in response to message A.

The BS 110 may indicate to the terminal that transmission of message B is a response to message A. To this end, a scheme for indicating that transmission of message B is the response to message A through the ID of the terminal is considered. The BS 110 may mask the PDCCH of message B by the identifier of the terminal. The identifier of the terminal is an identifier included in transmission of the PUSCH of message A. When the identifier of the terminal (for example, the C-RNTI or the unique ID of the terminal) transmitted in message A is masked by the PDCCH of message B, the BS 110 may not transmit preamble information used by the terminal for transmission of the PRACH of message A to the terminal Masking the PDCCH of message B by the identifier of the terminal means that message A which the terminal has already transmitted is normally provided to the BS.

Meanwhile, when decoding of the second part of message A, that is, decoding of the PUSCH fails, the BS 110 may not be aware of the identifier of the terminal. The BS 110 may mask the PDCCH of message B by using the RA-RNTI instead of the identifier of the terminal. At this time, in order to indicate the message B received by the terminal is the response to message A transmitted by the terminal, the BS 110 may consider a scheme for providing information on the random access preamble ID detected by the BS 110 to the terminal In the case of the 4-step RACH, the random access preamble ID is transmitted through the PDSCH of the RAR of Msg 2, and thus the terminal 120 may acquire the random access preamble ID detected by the BS. However, since message B is transmitted instead of Msg 2 in the 2-step RACH procedure, the BS 110 needs a scheme for informing the terminal 120 of the random access preamble ID detected by the BS on the basis of message B.

In some embodiments, the BS 110 may inform the terminal of the preamble ID used for message A on the basis of a new RA-RNTI. The new RA-RNTI may be referred to as a 2-step RACH RNTI. The RA-RNTI for the 2-step RACH may be generated on the basis of preamble information used by the terminal 120. At this time, the RA-RNTI for the 2-step RACH related to a PRACH occasion in which the random access preamble is transmitted may be calculated as follows.

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times Preamble\_ID \qquad \text{Equation 1}$$

$s\_id$ denotes a first OFDM symbol of a PRACH occasion and is a value larger than or equal to 0 and smaller than 14, $t\_id$ denotes a first slot of a system frame of a PRACH occasion and is a value larger than or equal to 0 and smaller than 80, $f\_id$ denotes an index of a PRACH occasion and is a value larger than or equal to 0 and smaller than 8, $ul\_carrier\_id$ is a value of a UL carrier used for a random access preamble and has a value of 0 if it is a normal uplink (NUL) carrier and has a value of 1 if it is a supplementary uplink (SUL) carrier. Preamble_ID may be random access preamble ID detected by the BS.

The BS 110 may compute a new RA-RNTI on the basis of the detected random access preamble and mask control information by the new RA-RNTI. A computing method of the new RA-RNTI is shared between the terminal 120 and the BS 110. The BS 110 may transmit message B including control information masked by the RA-RNTI and the RRC connection information to the terminal 120. The terminal 120 may decode message B by generating the RA-RNTI as shown in Equation 1 and demasking the PDCCH. The terminal 120 may identify the response according to transmission of the random access preamble of the terminal 120, that is, message B by acquiring the random access preamble ID.

In other embodiments, the BS 110 may inform the terminal 120 of the preamble ID used for message A on the basis of DCI. The BS 110 uses the existing RA-RNTI (that is, RA-RNTI=1+s_id+14×t_id+14×80×f_id+14×80×8×ul_carrier_id) like the 4-step RACH, but may inform the terminal 120 of the preamble ID of the terminal 120 through a separate field within the PDCCH. That is, the BS 110 may explicitly insert the preamble ID of the terminal 120 into DCI of message B. Message B includes downlink data transmission, that is, PDSCH transmission, and the DCI included in message B may use DCI format 1_0. At this time, for the 2-step RACH, the following DCI format may be defined as an example.

TABLE 1

Frequency domain resource allocation -$\lceil \log_2 (N\_"RB"$ $^"DL,BWP"(N\_"RB" ^"DL,BWP" + 1)/2)\rceil$ bits
N_"RB" ^"DL,BWP" has size of CORESET 0 if CORESET 0 is configured in cell and has size of initial DL BWP if CORESET 0 is not configured in cell
Time domain resource allocation-4 bits
VRB-to-PRB mapping-1 bit
Modulation and coding scheme-5 bits
TB scaling-2 bits
Random access preamble ID-6 bits
reserved bits-10 bits In other embodiments, similar to the random access response (RAR) of the 4-step RACH, the BS 110 may transmit the random access preamble ID to the terminal 120 through MAC layer information (for example, MAC subheader) within the PDSCH scheduled by the PDCCH. In other words, the BS 110 may transmit the random access preamble ID through the PDSCH of message B.

2. Case 2. PRACH Detection O and PUSCH Decoding X

Figure 7:
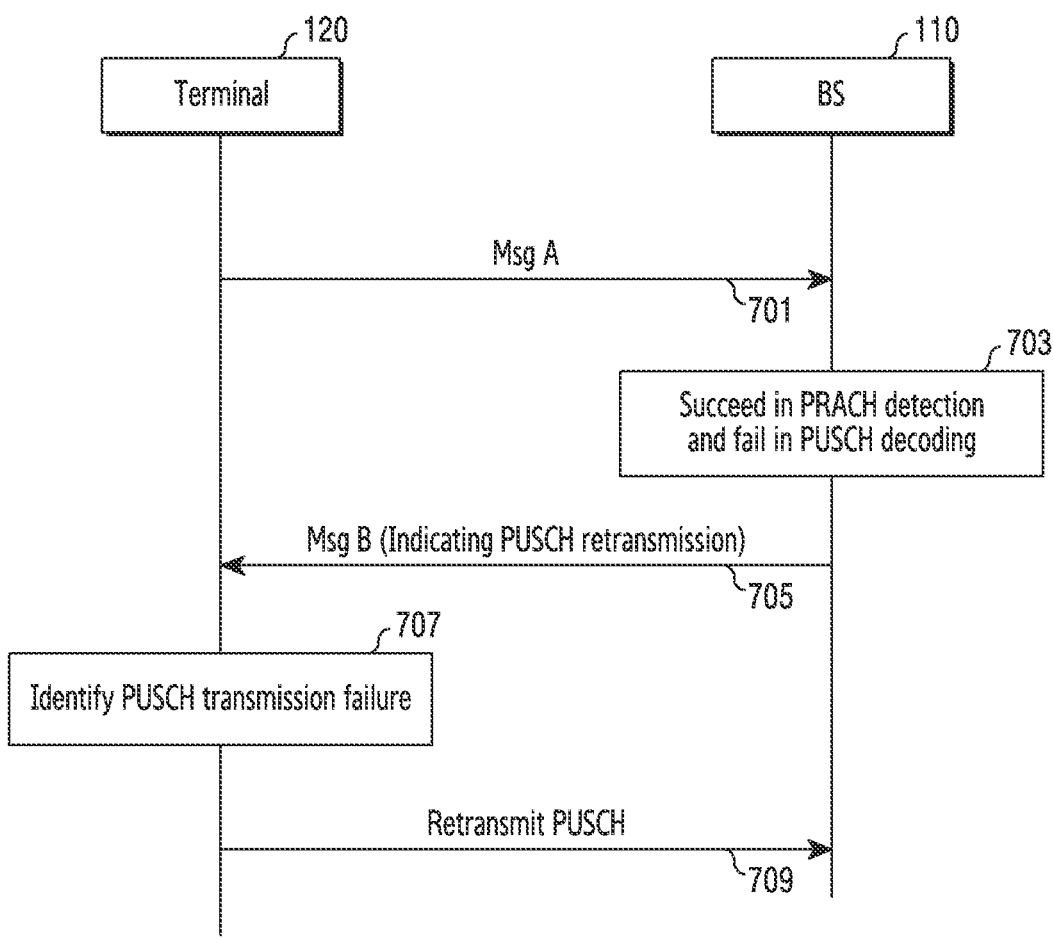
FIG. 7 illustrates another example of the 2-step RACH procedure in the wireless communication system according to various embodiments of the disclosure.

FIG. 7 illustrates another example of the 2-step RACH procedure in the wireless communication system according to various embodiments of the disclosure. In FIG. 7, the BS 110 detects a random access preamble of message A but fails in PUSCH decoding.

Referring to FIG. 7, in operation 701, the terminal 120 may transmit message A to the BS 110. Operation 701 corresponds to operation 601 of FIG. 6, and the same or similar description for transmission of message A may be omitted.

In operation 703, the BS 110 may detect the random access preamble of the PRACH and identify failure of PUSCH decoding. The BS 110 may attempt detection of the random access preamble through a correlation operation. The BS 110 may attempt PUSCH decoding when the random access preamble is detected. The BS 110 may identify failure of PUSCH decoding.

In operation 705, the BS 110 may transmit message B to the terminal 120. According to various embodiments, in order to retransmit the second part of message A, that is, for PUSCH retransmission, the BS 110 may transmit PUSCH retransmission-related information to the terminal 120. The BS 110 may transmit PUSCH retransmission-related information to the terminal 120 on the basis of message B. Control information of the PDCCH of message B may include PUSCH retransmission-related information or data of the PDSCH of message B may include PUSCH retransmission-related information.

According to various embodiments, PUSCH retransmission-related information may include indication information indicating PUSCH retransmission. The indication information may indicate that the BS 110 succeeds in PRACH detection but fails in PUSCH decoding. In some embodiments, the BS 110 may explicitly transmit indication information. For example, the BS 110 may insert information indicating retransmission of the PUSCH of message A into a DCI field of the PDCCH of message B. In other embodiments, the BS 110 may implicitly transmit indication information. For example, the BS 110 may transmit the indication information on the basis of an identifier for masking the PDCCH of message B. Message B may indicate PUSCH decoding failure and PUSCH retransmission when the PDCCH of message B is masked by the RA-RNTI, and may indicate PUSCH decoding success and that there is no need to retransmit the PUSCH when the PDCCH of message B is masked by the C-RNTI.

According to various embodiments, the PUSCH retransmission-related information may include resource information for PUSCH retransmission. In some embodiments, the PUSCH retransmission-related information may include uplink scheduling information. DCI within the PDCCH of message B may be DCI (for example, DCI format 0_0) for uplink resource allocation. The BS 110 may transmit uplink scheduling information through a resource allocation field. Resources for PUSCH retransmission may be indicated by a resource allocation field of DCI for uplink resource allocation (for example, frequency domain resource assignment or time domain resource assignment). The DCI may be CRC-scrambled by one of the C-RNTI/CS-RNTI/TC-RNTI. According to an embodiment, bits within the PDSCH may not be transmitted to increase data transmission efficiency. That is, the BS 110 may transmit only the PDCCH of message B. In other embodiments, the PUSCH retransmission-related information may include an index indicating a PUSCH occasion. The BS 110 may indicate a specific PUSCH occasion among the preconfigured PUSCH occasions through the index. The index may be transmitted through the PDCCH or the PDSCH of message B.

As mentioned in FIG. 6, the terminal 120 may be required to identify that message B received from the BS 110 is the response to the random access preamble transmitted by the terminal 120. Particularly, if PUSCH decoding fails as illustrated in FIG. 7, it is difficult to expect masking of the control channel by the identifier of the terminal, transmitted through message A, and thus the terminal 120 is required to acquire a random access preamble detected by the BS 110. That is, a scheme of informing the terminal 120 of an ID of the random access preamble detected by the BS on the basis of message B is needed.

In some embodiments, the BS 110 may inform the terminal 120 of the preamble ID used for message A on the basis of a new RA-RNTI. The new RA-RNTI may be referred to as a 2-step RACH RNTI. The RA-RNTI for the 2-step RACH may be generated on the basis of preamble information used by the terminal 120. For example, the RA-RNTI for the 2-step RACH may be computed on the basis of Equation 1.

In other embodiments, the BS 110 may inform the terminal 120 of the preamble ID used for message A on the basis of DCI. The BS 110 uses the existing RA-RNTI like the 4-step RACH, but may inform the terminal 120 of the preamble ID of the terminal 120 through a separate field within the PDCCH.

In other embodiments, similar to the random access response (RAR) of the 4-step RACH, the BS 110 may transmit the random access preamble ID to the terminal 120 through MAC layer information (for example, MAC sub-header) within the PDSCH scheduled by the PDCCH. In other words, the BS 110 may transmit the random access preamble ID through the PDSCH of message B. In addition, PUSCH retransmission-related resource information may be transmitted through the PDSCH. Referring to a MAC layer, a header of the MAC layer may include the random access preamble ID, and a payload of the MAC layer may include uplink resource allocation information, that is, UL scheduling information.

In operation 707, the terminal 120 cannot identify PUSCH transmission failure. The terminal 120 may identify PUSCH transmission failure on the basis of message B. The terminal 120 may identify PUSCH decoding failure of the BS on the basis of indication information. The terminal 120 may identify resources for PUSCH retransmission on the basis of message B. According to an embodiment, DCI of message B may include uplink resource allocation for PUSCH retransmission, that is, a UL grant. According to another embodiment, information indicating a PUSCH occasion for PUSCH retransmission may be included in the PDSCH of message B.

In operation 709, the terminal 120 may perform PUSCH retransmission. The terminal 120 may perform PUSCH retransmission through PUSCH retransmission resources (for example, UL grant) indicated through message B. At this time, a redundancy version (RV) may be used for PUSCH retransmission. The BS 110 may increase the performance of PUSCH decoding through HARQ combining of retransmitted PUSCH payloads.

In some embodiments, the RV used for PUSCH transmission may be defined on the basis of the random access preamble. That is, the terminal 120 may select one of a plurality of random access preamble groups and identify a random access preamble in the selected group. Thereafter, the RV used for PUSCH transmission may be determined according to the selected group. For example, if a random access preamble of a first group is selected, the PUSCH may be encoded by RV0. For example, if a random access preamble of a second group is selected, the PUSCH may be encoded by RV2. For example, if a random access preamble of a third group is selected, the PUSCH may be encoded by RV3. According to an embodiment, the RV used for PUSCH transmission may be defined on the basis of not only the random access preamble but also timing of PUSCH transmission. The terminal 120 may determine an RV value on the basis of a random access preamble group and a function of PUSCH transmission timing (for example, symbol number).

In other embodiments, the RV used for PUSCH transmission may be determined according to a predetermined pattern. According to an embodiment, the predetermined pattern may be an order determined by the standard (for example, RV0→RV2→RV3→RV1). According to another embodiment, the predetermined pattern may be determined on the basis of a modulo operation of the number (N) of PUSCH transmissions (for example, N mod 4=RV index). According to another embodiment, the predetermined pattern may be designated by the configuration information in operation 401 of FIG. 4.

In other embodiments, the RV value used for PUSCH retransmission may be fixed. The RV value to be fixedly used may be determined on the basis of at least one of the standard, an RV field of a DCI field for uplink resource allocation, RACH configuration information, and PUSCH retransmission resource information.

In FIG. 7, a scheme for indicating PUSCH retransmission and a signaling scheme of resource allocation for PUSCH retransmission have been described. Message B may include DCI within the PDCCH as downlink transmission. At this time, when the random access preamble ID is indicated through the PDCCH rather than the PDSCH, for example, when the PDCCH is masked by the 2-step RACH RA-RNTI or the random access preamble detected by the BS 110 is indicated using a specific field within the PDCCH, a DCI format (for example, DCI format 0_0) for uplink resource allocation may be used. In this case, the terminal may not distinguish between CASE 1 and CASE 2 in advance, and accordingly, should perform blind detection of DCI format 0_0 and DCI format 1_0.

3. Case 3. PRACH Detection X

Figure 8:
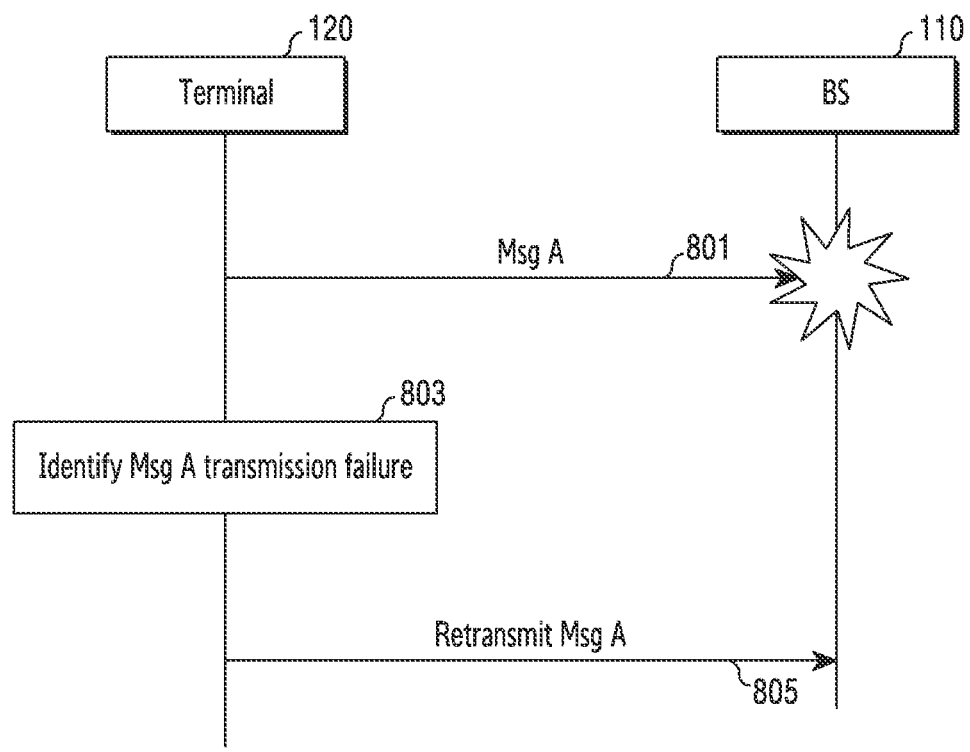
FIG. 8 illustrates another example of the 2-step RACH procedure in the wireless communication system according to various embodiments of the disclosure.

FIG. 8 illustrates another example of the 2-step RACH procedure in the wireless communication system according to various embodiments of the disclosure. In FIG. 8, the BS 110 cannot detect the first part of message A, that is, the random access preamble of the PRACH.

Referring to FIG. 8, in operation 801, the terminal 120 may transmit message A to the BS 110. The terminal 120 may attempt transmission of the PRACH including the random access preamble to the BS 110. Further, the terminal 120 may attempt transmission of the PUSCH including an identifier of the terminal 120 to the BS 110.

In operation 803, the terminal 120 may identify failure of transmission of message A. Since the BS 110 could not detect the preamble of message A, the later operation (for example, transmission of message B) cannot be performed. When message B which is a response to message A is not received for a predetermined time, the terminal 120 may identify failure of transmission of message A. According to an embodiment, the predetermined time may be indicated by configuration information for the 2-step RACH. For example, the predetermined time may correspond to msgB-ResponseWindow of FIG. 4.

In operation 805, the terminal 120 may retransmit message A. The terminal 120 may retransmit both the PRACH and the PUSCH unlike in FIG. 7. According to an embodiment, the terminal 120 may ramp PRACH power. According to an embodiment, the terminal 120 may ramp PUSCH power. If entire message A is retransmitted, both the PRACH and the PUSCH may be retransmitted. At this time, according to an embodiment, an RV applied to PUSCH retransmission may be the same as that in PUSCH retransmission or an RV changed according to a permutation (for example, RV0, RV2, RV3, and RV1).

Although not illustrated in FIG. 8, the terminal 120 may transmit the random access preamble through the PRACH without PUSCH transmission, rather than retransmitting message A. Thereafter, the terminal may receive the random access response and transmit a message including identity of the terminal 120 to the BS. That is, the terminal 120 may perform fallback to the 4-step RACH. According to an embodiment, if the terminal 120 does not receive message B for the predetermined time or the number of times message B is not received for the predetermined time is larger than or equal to a threshold value, the terminal 120 may determine fallback to the 4-step RACH.

III. Indicates PUSCH Retransmission

As described above, if the random access preamble of the PRACH is detected but PUSCH decoding fails, PUSCH decoding failure may be indicated through message B. At this time, the BS 110 may indirectly indicate to the terminal 120 whether the PUSCH is retransmitted by masking the PDCCH of message B by a different identifier according to whether the PUSCH decoding is successful. Hereinafter, operations of the BS and the terminal for PUSCH retransmission based on the identifier are described with reference to FIGS. 9 to 10.

1. Indicates PUSCH Retransmission Based on Identifier

Figure 9:
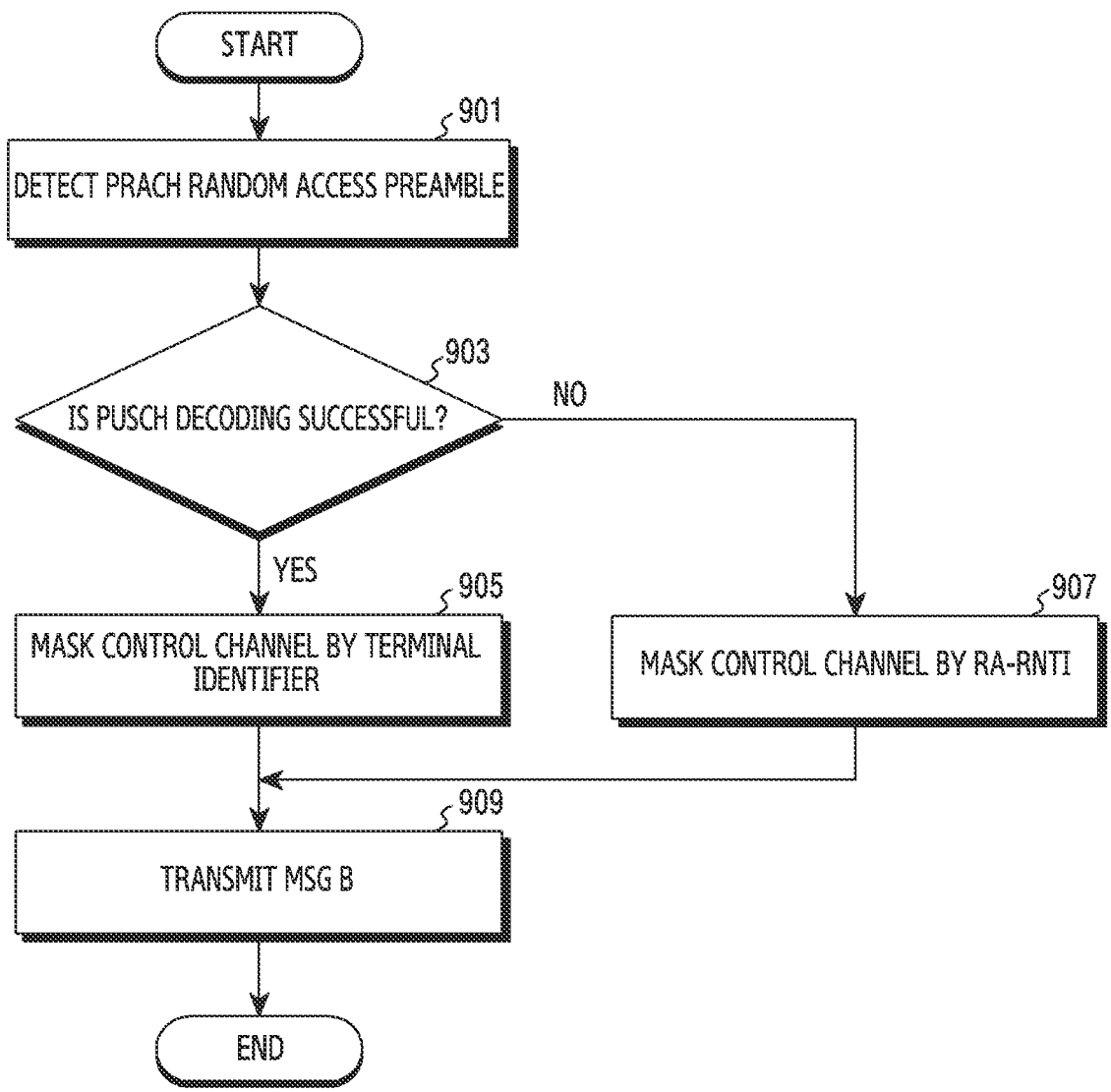
FIG. 9 is a flowchart illustrating the operation of the BS for identifier-based physical uplink shared channel (PUSCH) retransmission in a wireless communication system according to various embodiments of the disclosure.

FIG. 9 is a flowchart illustrating an operation of the BS 110 for physical uplink shared channel (PUSCH) retransmission based on an identifier in a wireless communication system according to various embodiments of the disclosure.

Referring to FIG. 9, in operation 901, the BS 110 may detect a random access preamble of a PRACH. The BS 110 may detect a random access preamble transmitted by the terminal 120 through a correlation operation within a sequence range designated in an RACH occasion.

In operation 903, the BS 110 may determine whether PUSCH decoding is successful. When the random access preamble is detected, the BS 110 may expect PUSCH transmission according to the 2-step RACH procedure. The BS 110 may attempt PUSCH decoding. The BS 110 may perform operation 905 if PUSCH decoding is successful. The BS 110 may perform operation 907 if PUSCH decoding fails.

In operation 905, the BS 110 may mask a control channel (for example, PDCCH) by the terminal identifier. The terminal identifier may be provided through the PUSCH of message A. Making by the terminal identifier may indicate success of PUSCH decoding. This is because the terminal identifier can be acquired if the BS 110 successfully decoded the PUSCH. The terminal identifier may be a C-RNTI when the C-RNTI has been already allocated to the terminal 120, may be a TC-RNTI when the TC-RNTI is included in previous message B, and may be a unique ID of the terminal 120 when there is no identifier allocated to the terminal 120. For example, the unique ID may be defined on the basis of a communication service provider or a terminal identification number.

In operation 907, the BS 110 may mask the control channel (for example, PDCCH) by an RA-RNTI. The RA-RNTI may be computed on the basis of resources through which the random access preamble is transmitted. That is, the RA-RNTI may be computed even though the BS 110 cannot succeed in PUSCH decoding. According to an embodiment, in order to provide the random access preamble ID to the terminal 120, a new RA-RNTI may be defined. The new RA-RNTI may use the random access preamble ID as well as resources through which the random access preamble is transmitted. In this case, the random access preamble ID is information which can be identified through PRACH detection, and thus the new RA-RNTI can be computed although PUSCH decoding is not successful. According to various embodiments, masking by the RA-RNTI may indicate PUSCH decoding failure in an aspect relative to operation 905.

In operation 909, the BS 110 may transmit message B. The PDCCH of message B may include downlink control information based on operation 905 or operation 907.

Figure 10:
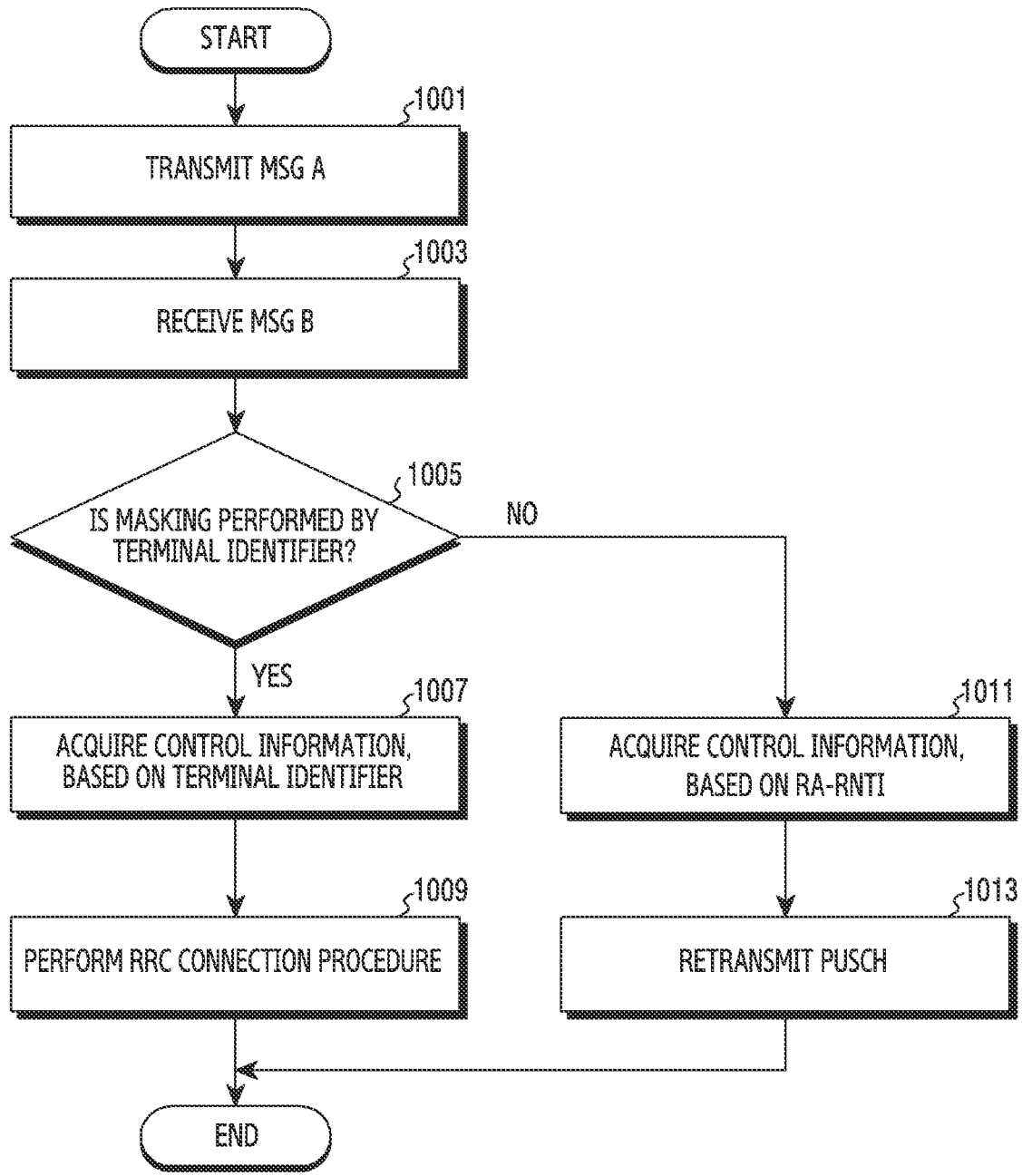
FIG. 10 is a flowchart illustrating the operation of the terminal for identifier-based PUSCH retransmission in a wireless communication system according to various embodiments of the disclosure.

FIG. 10 is a flowchart illustrating the operation of the terminal 120 for identifier-based PUSCH retransmission in a wireless communication system according to various embodiments of the disclosure.

Referring to FIG. 10, in operation 1001, the terminal 120 may transmit message A. Transmission of message A may include PRACH transmission and PUSCH transmission. PRACH transmission may include transmission of the random access preamble. PUSCH transmission may include transmission of the terminal identifier.

In operation 1003, the terminal 120 may receive message B. Message B may be transmitted through the PDCCH or the PDCCH/PDSCH. Message B may indicate whether PRACH transmission is successful and PUSCH transmission is successful. For example, indication information acquired through message B may indicate detection of the random access preamble and success of PUSCH decoding by the BS 110. The indication information may indicate detection of the random access preamble and failure of PUSCH decoding by the BS 110. In order to determine which one of the two cases is indicated by the indication information, the terminal 120 may determine which identifier is used for masking (that is, CRC scrambling).

In operation 1005, the terminal 120 may determine whether a control channel (for example, PDCCH) of message B is masked by the terminal identifier. The terminal identifier may be a terminal identifier included in transmission of message A in operation 1001. The terminal 120 may perform 1007 when the control channel of message B is masked by the terminal identifier. On the other hand, when the control channel of message B is not masked by the terminal identifier, for example, when the control channel is masked by an RA-RNTI, the terminal 120 may perform operation 1011.

In operation 1007, the terminal 120 may acquire control information on the basis of the terminal identifier. The BS 110 may acquire the terminal identifier only if PUSCH decoding is successful. Accordingly, masking of the control channel of message B by the terminal identifier may indicate that the BS 110 has successfully decoded the PUSCH. For example, if masking is performed by a C-RNTI (in the case in which the C-RNTI has been allocated) or a unique ID (for example, in the case in which the RNTI has never been allocated to the terminal 120), the terminal 120 may consider that message A is completely properly decoded (that is, detection of the random access preamble and success of PUSCH decoding) and analyze message B. According to an embodiment, since the PUSCH decoding was successful, the terminal 120 may analyze message B as an RRC connection setup message. Message B may include access information for the RRC connection and a contention resolution identity.

In operation 1009, the terminal 210 may perform an RRC connection procedure. The terminal 120 may perform the RRC connection procedure on the basis of access information for the RRC connection included in message B.

In operation 1011, the terminal 120 may acquire control information on the basis of the RA-RNTI. The RA-RNTI may be computed on the basis of resources through which the random access preamble is transmitted. Alternatively, the RA-RNTI may be computed on the basis of resources through which the random access preamble is transmitted and a random access preamble ID. That is, the RA-RNTI may be computed regardless of the result of PUSCH decoding when detection of the random access preamble is completed.

The BS 110 may acquire the terminal identifier only when the PUSCH decoding is successful, and the RA-RNTI may be computed without the terminal identifier. Accordingly, contrary to operation 1007 and operation 1009, the terminal 120 may consider that decoding of the PUSCH of message A fails and analyze message B when the PDCCH of message B is masked by the RA-RNTI. According to an embodiment, the PUSCH decoding fail, and thus the terminal 120 may analyze message B to include scheduling information for PUSCH retransmission. For example, downlink control information included in message B may be analyzed as downlink control information of a DCI format for an uplink grant. The terminal 120 may identify that PUSCH retransmission is needed by identifying that the PDCCH of message B is masked by the RA-RNTI.

In operation 1013, the terminal 120 may perform PUSCH retransmission. The terminal 120 may identify PUSCH retransmission resources based on message B. The terminal 120 may perform PUSCH retransmission in the identified resources. Operation 1013 corresponds to operation 709 of FIG. 7, so the same or similar description may be omitted.

2. Indicates PUSCH Retransmission Based on Control Information Format

When an identifier for CRC masking of the control channel varies depending on whether PUSCH decoding is successful, the terminal 120 may perform demasking by the terminal identifier and attempt the demasking again by the RA-RNTI. The control channel is masked by the RA-RNTI for efficiency, and whether PUSCH decoding is successful may be indicated according to the type of control information included in message B. If PUSCH decoding fails, control information may include uplink resource allocation for PUSCH retransmission. Meanwhile, if PUSCH decoding is successful, the control information may include downlink resource allocation to transmit information required for the RRC connection setup (for example, signal radio bearer (SRB) 0 configuration information and dedicated radio bearer (DRB) configuration information). The BS 110 may indirectly indicate whether the PUSCH is retransmitted according to a format of the control information (whether UL resource allocation is included or DL resource allocation is included). Hereinafter, operations of the BS and the terminal for control information format-based PUSCH retransmission are described with reference to FIGS. 11 to 12.

Figure 11:
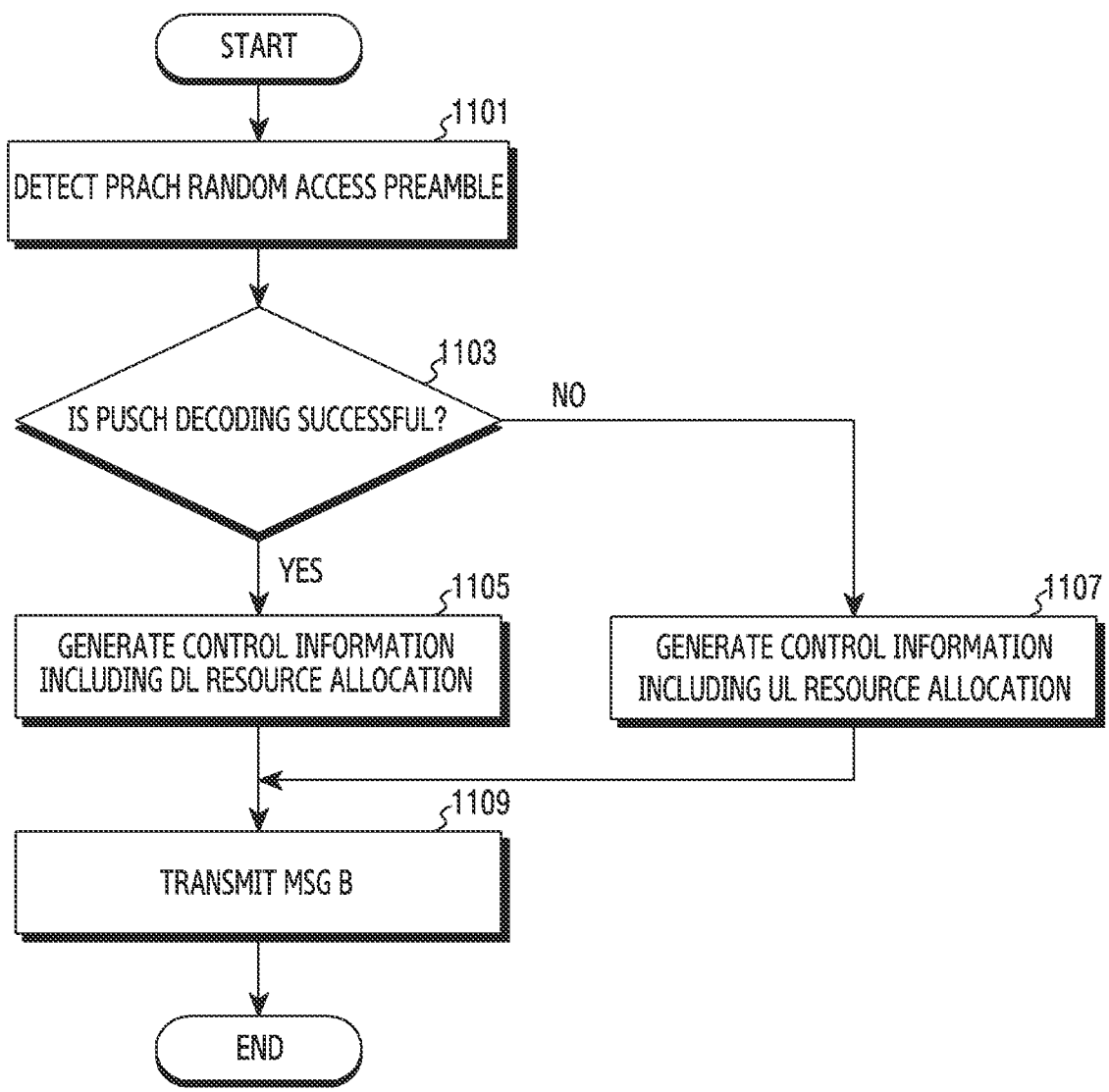
FIG. 11 is a flowchart illustrating the operation of the BS for control information format-based PUSCH retransmission in a wireless communication system according to various embodiments of the disclosure.

FIG. 11 is a flowchart illustrating the operation of the BS 110 for control information format-based PUSCH retransmission in a wireless communication system according to various embodiments of the disclosure.

Referring to FIG. 11, in operation 1101, the BS 110 may detect a random access preamble of a PRACH. The BS 110 may detect the random access preamble transmitted by the terminal 120 through a correlation operation within a sequence range designated in an RACH occasion.

In operation 1103, the BS 110 may determine whether PUSCH decoding is successful. When the random access preamble is detected, the BS 110 may expect PUSCH transmission according to the 2-step RACH procedure. The BS 110 may attempt PUSCH decoding. The BS 110 may perform operation 1105 if PUSCH decoding is successful. The BS 110 may perform operation 1107 if PUSCH decoding fails.

In operation 1105, the BS 110 may generate control information including DL resource allocation. Since PUSCH decoding has been succeeded, the BS 110 may provide information for the RRC connection setup to the terminal 120 through the PDSCH. Information for the RRC connection setup (for example, bearer information and UE-specific configuration information) is provided to the terminal 120 through the PDSCH, and the control information may include DL resource allocation. The control information is downlink control information for DL resource allocation, and may be generated, for example, according to DCI format 1_0 or DCI format 1_1. That is, the control information including the DL resource allocation does not indicate PUSCH retransmission, and thus may indirectly indicate PUSCH decoding success. According to an embodiment, the BS 110 may configure a value of a format identifier field (for example, identifier for DCI formats of 3GPP TS 38.212) included in the control information to indicate a DL DCI format. For example, a value of the identifier may be 1.

In operation 1107, the BS 110 may generate control information including UL resource allocation. Since PUSCH decoding has failed, the BS 110 may provide resource information for PUSCH retransmission to the terminal 120 through the PDCCH. PUSCH retransmission is uplink transmission, so that the control information may be generated according to, for example, DCI format 0_0 or DCI format 0_1 as downlink control information for UL resource allocation. That is, the control information including the UL resource allocation indirectly indicates PUSCH retransmission and thus may indicate PUSCH decoding failure. According to an embodiment, the BS 110 may configure a value of a format identifier field included in the control information to indicate a UL DCI format. For example, a value of the identifier may be 0.

In operation 1109, the BS 110 may transmit message B. The PDCCH of message B may include downlink control information based on operation 1105 or operation 1107.

Figure 12:
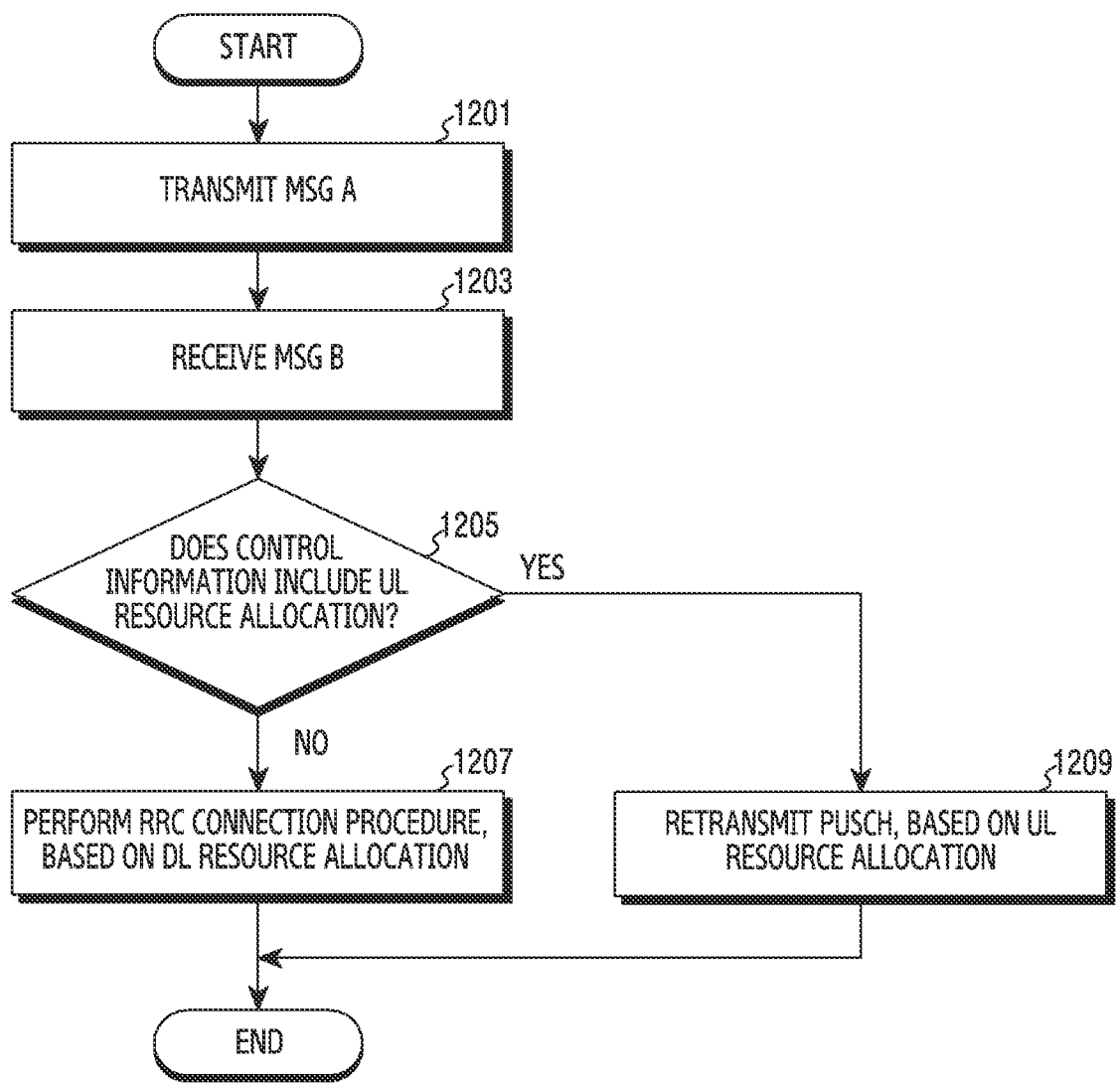
FIG. 12 is a flowchart illustrating the operation of the terminal for control information format-based PUSCH retransmission in a wireless communication system according to various embodiments of the disclosure.

FIG. 12 is a flowchart illustrating the operation of the terminal 120 for control information format-based PUSCH retransmission in a wireless communication system according to various embodiments of the disclosure.

Referring to FIG. 12, in operation 1201, the terminal 120 may transmit message A. Transmission of message A may include PRACH transmission and PUSCH transmission. The PRACH transmission may include transmission of a random access preamble. PUSCH transmission may include transmission of a terminal identifier.

In operation 1203, the terminal 120 may receive message B. Message B may be transmitted through a PDCCH/PDSCH or only through the PDCCH for efficiency. Message B may indicate whether PRACH transmission is successful and PUSCH transmission is successful. For example, indication information acquired through message B may indicate detection of the random access preamble and success of PUSCH decoding by the BS 110. The indication information may indicate detection of the random access preamble and failure of PUSCH decoding by the BS 110. In order to determine which one of the two cases is indicated by the indication information, the terminal 120 may determine which identifier is used for scrambling.

In operation 1205, the terminal 120 may determine whether control information within the PDCCH of message B includes UL resource allocation information. The terminal 120 may determine whether control information includes UL resource allocation information according to a format of the control information. For example, if the format of the control information is DCI format 1_0 or DCI format 1_1, the terminal 120 may determine that the control information does not include UL resource allocation information. For example, if the format of the control information is DCI format 0_0 or DCI format 0_1, the terminal 120 may determine that the control information includes UL resource allocation information. The DCI format may be determined according to the value of the format identifier field included in the control information. The terminal 120 may determine that the control information includes UL resource allocation if the value of the corresponding field is 0, and determine that the control information includes DL resource allocation if the value of the corresponding field is 1. If the size of payload (the total number of bits) of the Msg B PDCCH (for example, DCI format 1_0) transmitted if Msg A PUSCH reception/decoding is successful is the same as the size of payload of Msg B PDCCH (for example, DCI format 0_0) transmitted if Msg A PUSCH reception/decoding fails, the terminal 120 may determine whether PUSCH decoding is successful through the format type.

If the control information does not include the UL resource allocation information, the terminal 120 may perform operation 1207. If the control information includes the UL resource allocation, the terminal 120 may perform operation 1209.

In operation 1207, the terminal 120 may perform an RRC connection procedure on the basis of DL resource allocation. The terminal 120 may decode the PDSCH on the basis of the DL resource allocation. The terminal 120 may acquire information related to the RRC connection setup included in the PDSCH. The terminal 120 may perform the RRC connection setup on the basis of information related to the RRC connection setup and transmit a connection setup completion message to the BS 110.

In operation 1209, the terminal 120 may perform PUSCH retransmission on the basis of UL resource allocation. The terminal 120 may identify that the BS fails in PUSCH decoding from the UL resource allocation. The terminal 120 may determine PUSCH transmission failure. The terminal 120 may perform PUSCH retransmission on the basis of UL resource allocation. Operation 1209 corresponds to operation 709 of FIG. 7, so the same or similar description may be omitted.

IV. 2-Setp RACH Vs 4-Step RACH

The 2-step RACH may reduce signaling overhead of the BS and the terminal, but transmit a relatively large amount of information in the state in which there is no uplink synchronization compared to the 4-step RACH, and thus may become unstable according to a channel state. Accordingly, the BS or the terminal is required to determine one of the 2-step RACH and the 4-step RACH to perform the random access procedure before or while initiating the random access procedure. Hereinafter, examples of selection and switching (for example, fallback from the 2-step RACH to the 4-step RACH) between the 2-step RACH and the 4-step RACH are described with reference to FIGS. 13A to 17B.

1. UE Selection Scheme

The terminal 120 may receive an SSB block and acquire an MIB through PBCH decoding. The terminal 120 may acquire SIB 1. The terminal 120 may perform a random access procedure on the basis of the MIB and SIB 1. At this time, the terminal 120 may determine one of the 2-step RACH and the 4-step RACH to perform random access.

In some embodiments, the terminal 120 may determine a random access scheme on the basis of a communication frequency band. The terminal 120 may perform communication in an unlicensed band (for example, NR-U or 5 GHz to 7.125 GHz). When communication is performed in the unlicensed band, the terminal 120 is required to perform LBT for channel occupancy. The 4-step RACH procedure includes four signalings, and thus four LBT operations may be needed. In order to reduce the overhead, the terminal 120 may perform the 2-step RACH procedure in the unlicensed band.

In other embodiments, the terminal 120 may determine the random access scheme on the basis of a service type. In the case of a service requiring low latency (for example, mission critical service), the service is required to more rapidly access the network.

In other embodiments, the terminal 120 may determine the random access scheme on the basis of a channel quality. The terminal 120 may receive SSBs. The terminal 120 may determine a channel quality of each of the received SSBs. The terminal 120 may identify an SSB to be used for access among the SSBs on the basis of the channel quality. For example, the channel quality may be an RSRP. A detailed operation therefor is described with reference to FIGS. 13A and 13B.

Figure 13A:
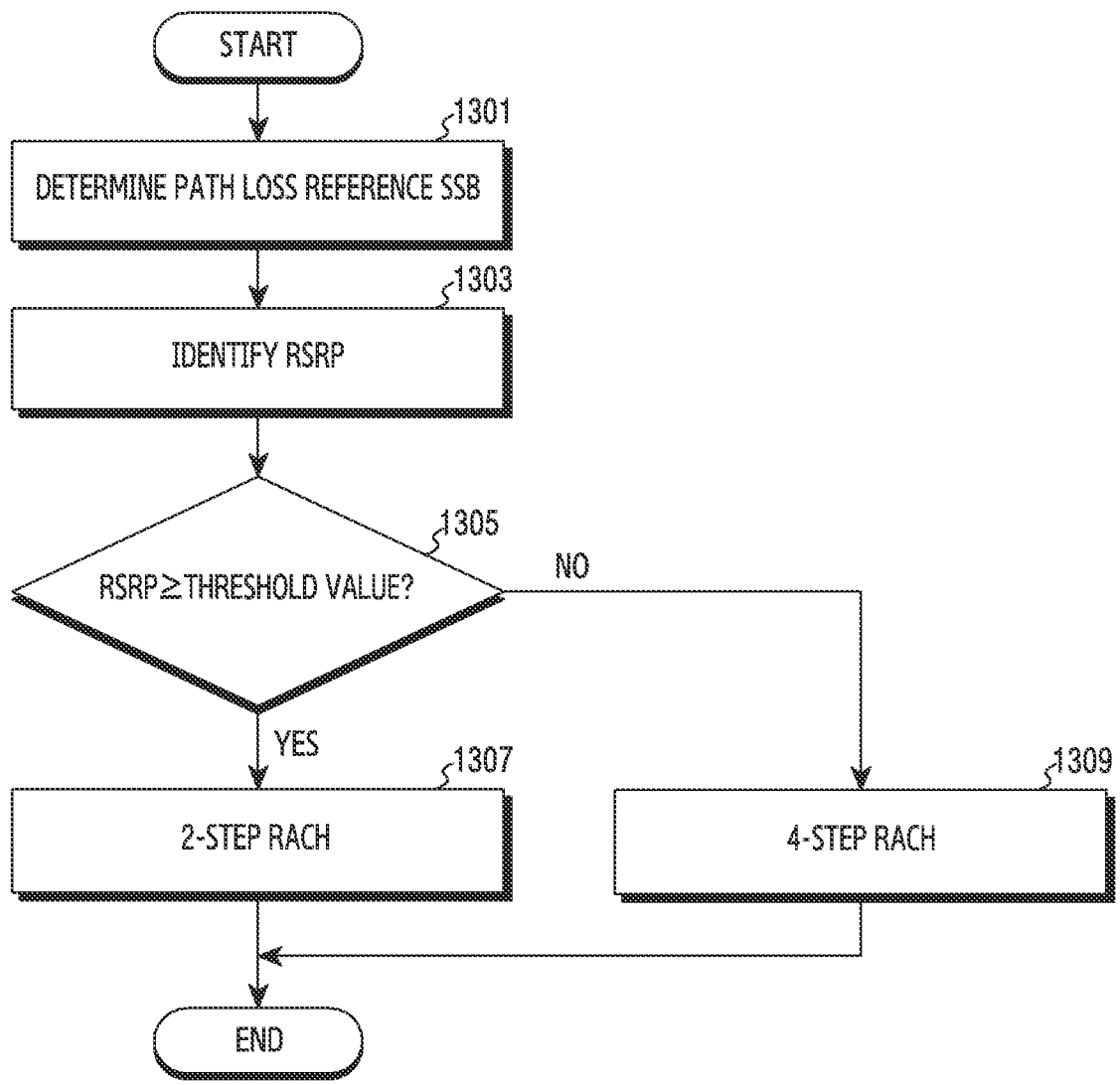
FIG. 13A is a flowchart illustrating the operation of the terminal for determining a random access type in a wireless communication system according to various embodiments of the disclosure.

FIG. 13A is a flowchart illustrating the operation of the terminal 120 for determining a random access type in a wireless communication system according to various embodiments of the disclosure.

Referring to FIG. 13A, in operation 1301, the terminal 120 may determine a path loss reference SSB. The terminal 120 may measure the channel quality of each of the received SSBs and identify the SSB on the basis of the channel quality measurement result. The terminal 120 may determine the identified SSB as a reference SSB for estimating path loss.

In operation 1303, the terminal 120 may identify an RSRP value of the reference SSB.

In operation 1305, the terminal 120 may determine whether the RSRP value is larger than a threshold value. If the RSRP value is larger than or equal to the threshold value, the terminal 120 may perform operation 1307. If the RSRP value is smaller than the threshold value, the terminal 120 may perform operation 1309.

In operation 1307, the terminal 120 may determine the 2-step RACH as the random access type. The terminal 120 may transmit a random access preamble and message A including a terminal identifier to the BS 110. The random access preamble may be transmitted through a PRACH, and the terminal identifier may be transmitted through a PUSCH.

In operation 1309, the terminal 120 may determine the 4-step RACH as the random access type. The terminal 120 may transmit the random access preamble to the BS 110 through the PRACH. The random access preamble may correspond to Msg 1.

A procedure for determining the random access type on the basis of the RSRP of the reference SSB for estimating path loss may be performed through a combination with a procedure for determining whether to use an SUL carrier or an NUL carrier for random access preamble transmission. Whether to use the SUL carrier is also determined on the basis of the RSRP of the reference SSB, and the two determinations may be consecutively performed. An example of the procedure for determining whether to use the SUL carrier and determining the random access type may be performed as illustrated in FIG. 13B below.

Figure 13B:
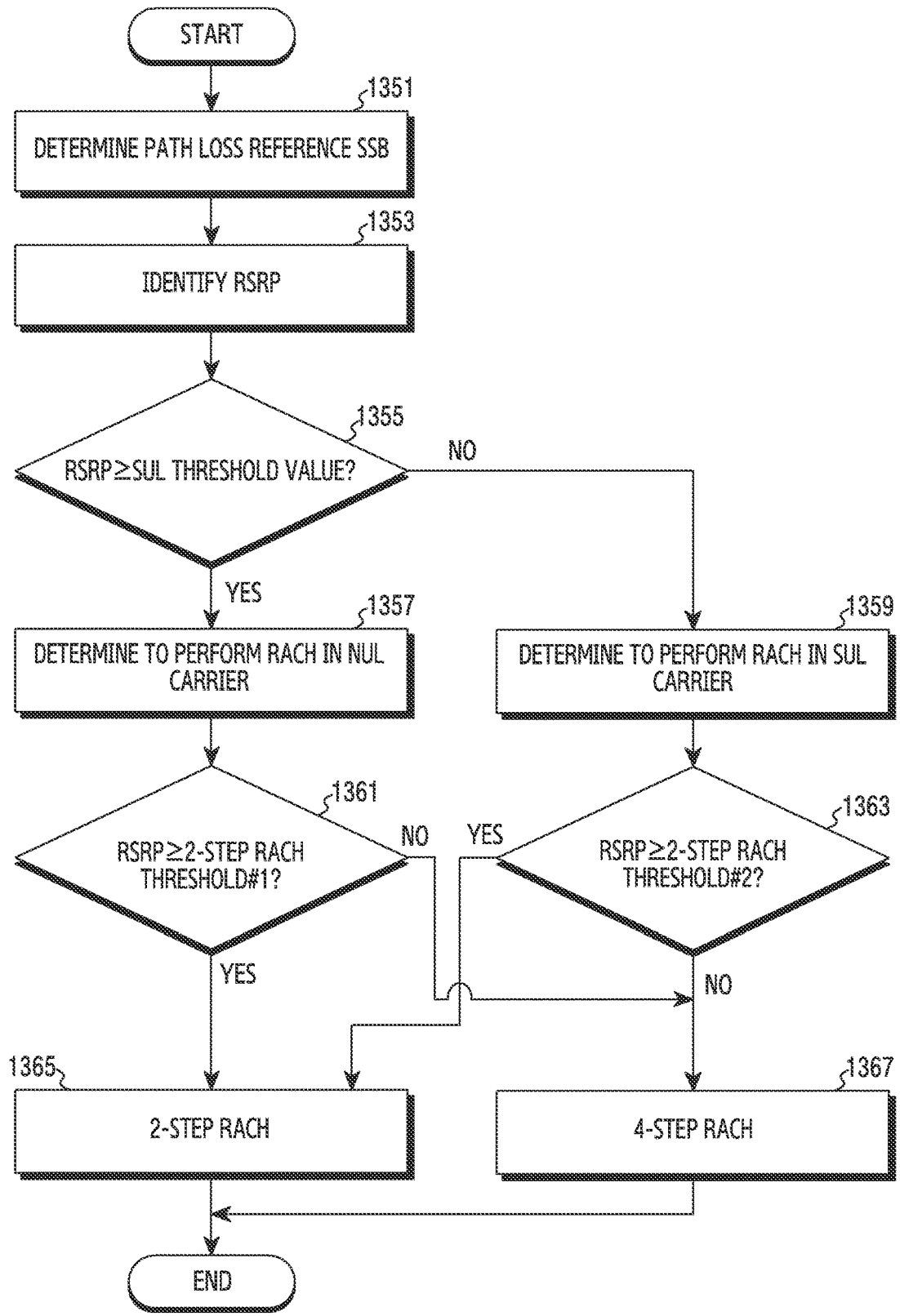
FIG. 13B is a flowchart illustrating the operation of the terminal for determining whether to use a supplementary uplink (SUL) and determining a random access type in a wireless communication system according to various embodiments of the disclosure.

FIG. 13B is a flowchart illustrating the operation of the terminal 120 for determining whether to use a supplementary uplink (SUL) and determining a random access type in a wireless communication system according to various embodiments of the disclosure.

Referring to FIG. 13B, in operation 1351, the terminal 120 may determine a path loss reference SSB. In operation 1353, the terminal 120 may identify an RSRP value of the reference SSB. Since operation 1351 and operation 1353 correspond to operation 1301 and operation 1303 of FIG. 13A, the same or similar description may be omitted.

If the RSRP is larger than or equal to the SUL threshold value in operation 1355, the terminal 120 may perform operation 1357. On the other hand, if the RSRP is smaller than the SUL threshold value the terminal 120 may perform operation 1359. If the channel quality is low, it is required to perform the random access procedure using a stable uplink carrier, and thus the SUL carrier may be used.

In operation 1357, the terminal 120 may determine to perform the RACH in the NUL carrier. The terminal 120 may configure terminal maximum power (PCMAX) of the NUL carrier.

In operation 1359, the terminal 120 may determine to perform the RACH in the SUL carrier. The terminal 120 may configure terminal maximum power (PCMAX) of the SUL carrier.

In operation 1361, the terminal 120 may determine whether the RSRP is larger than or equal to a first threshold value for the 2-step RACH. The first threshold value may be a 2-step RACH determination threshold value for the NUL carrier. If the RSRP is larger than or equal to the first threshold value, the terminal 120 may perform operation 1365, that is, the 2-step RACH. If the RSRP is smaller than the first threshold value, the terminal 120 may perform operation 1367, that is, the 4-step RACH.

When the terminal 120 operates in the SUL carrier in operation 1363, the terminal 120 may determine whether the RSRP is larger than or equal to a second threshold value for the 2-step RACH. The second threshold value may be a 2-step RACH determination threshold value for the SUL carrier. If the RSRP is larger than or equal to the second threshold value, the terminal 120 may perform operation 1365, that is, the 2-step RACH. If the RSRP is smaller than the second threshold value, the terminal 120 may perform operation 1367, that is, the 4-step RACH.

Although the RSRP is described an example in FIG. 13B, another channel quality parameter other than the RSRP may be applied. According to an embodiment, the threshold value of the procedure for determining whether to use the SUL or the NUL may be transmitted through higher-layer signaling. According to an embodiment, the threshold value for determining the random access type, that is, the threshold value for selecting one of the 2-step RACH procedure and the 4-step RACH procedure may be transmitted through higher-layer signaling. For example, higher-layer signaling may be SIB 1.

Although FIG. 13B describes that the first threshold value for the NUL and the second threshold value for the SUL exist separately in FIG. 13B, only one threshold value may exist according to an embodiment. The SUL is an uplink carrier used for the stable connection, and thus may not be suitable for the 2-step RACH. Accordingly, the terminal 120 may not perform the 2-step RACH in the SUL. If the SUL is selected to perform the random access procedure, the terminal 120 may be required to perform the 4-step RACH procedure. Meanwhile, if the NUL is selected, the terminal 120 may additionally determine whether to perform the 2-step RACH or the 4-step RACH in the NUL. In other words, operation 1363 may be omitted. That is, it is determined whether to use the SUL carrier and then, only if the SUL carrier is not used, the operation for determining whether to perform the 2-step RACH or the 4-step RACH procedure may be understood as an embodiment of the disclosure.

2. NW Selection Scheme before the terminal initiates the random access procedure, a network entity (for example, gNB) may determine the random access type. The random access procedure is initiated by the terminal, and the network entity may indicate the determined random access type to the terminal before a random access preamble (that is, before transmission of Msg 1 of the 4-step RACH or transmission of Msg A of the 2-step RACH).

At this time, the indication may be made according to the following schemes.

1) Scheme for informing that the 2-step RACH is possible and then indicating the performance of the 2-step RACH and the 4-step RACH 2) Scheme for indicating the performance of the 2-step RACH. A detailed operation of the BS 120 is described with reference to FIG. 14.

Figure 14:
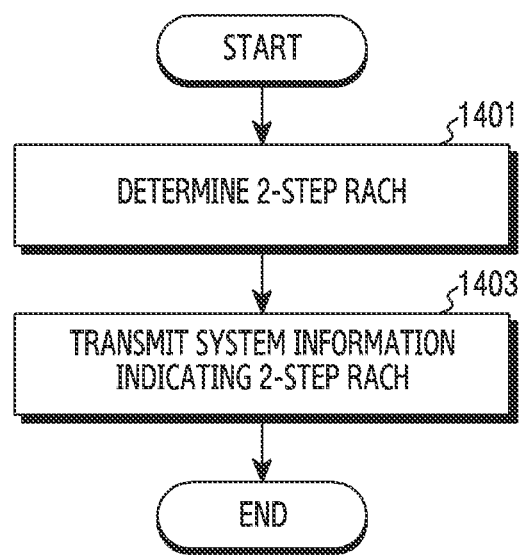
FIG. 14 is a flowchart illustrating the operation of the BS for indicating a random access type in a wireless communication system according to various embodiments of the disclosure.

3) Scheme for informing that only the 2-step RACH is possible and allowing the terminal to select the 2-step RACH and the 4-step RACH FIG. 14 is a flowchart illustrating the operation of the BS 110 for indicating a random access type in a wireless communication system according to various embodiments of the disclosure.

Referring to FIG. 14, in operation 1401, the BS 110 may determine the 2-step RACH. The BS 110 may determine the 2-step RACH among the 2-step RACH and the 4-step RACH as the random access type. The determination by the BS 110 may be performed by network implementation.

In some embodiments, the BS 110 may determine the 2-step RACH on the basis of a channel quality. The BS 110 may collect channel quality information provided by terminals accessing a cell of the BS 110. The BS 110 may determine the 2-step RACH on the basis of the collected channel quality information.

In other embodiments, the BS 110 may determine the 2-step RACH on the basis of available capacity. For example, as the number of terminals accessing the BS 110 is larger, access through the 2-step RACH is not easy. Accordingly, the BS 110 may make a request for performing the 4-step RACH for more stable contention. On the other hand, as the number of terminals accessing the BS 110 is smaller, an access success probability through the 2-step RACH may increase.

In other embodiments, the BS 110 may determine the 2-step RACH on the basis of the cell size. In the case of a relatively small cell, the stable connection between the BS 110 and the terminal 120 may be provided. The BS 110 may determine the 2-step RACH on the basis of whether the cell is a small cell or provision by implementation of distributed deployment. For example, if a service radius is smaller than a predetermined value, the BS 110 may determine the 2-step RACH.

In operation 1403, the BS 110 may transmit system information indicating the 2-step RACH. In some embodiments, the system information may be an MIB. For example, a spare bit of 1 bit of the MIB may indicate the 2-step RACH or the 4-step RACH. In other embodiments, the system information may be SIB1. Serving cell information of SIB1 may indicate the 2-step RACH.

Although it indicates the 2-step RACH in FIG. 14, determination of the 4-step RACH among the 2-step RACH and the 4-step RACH as the random access type and non-transmission of separate indication information may also be understood as an embodiment of the disclosure. As information indicating the 2-step RACH is not received through the system information (for example, MIB or SIB1), the terminal 120 may determine to perform the random access procedure using the 4-step RACH.

Meanwhile, unlike in FIG. 14, the BS 110 may indicate that the 2-step RACH is possible rather than indicating to perform the 2-step RACH. Thereafter, the BS 110 may separately indicate the performance of the 2-step RACH or the 2-step RACH may be initiated by determination of the terminal 120. For example, information indicating that the 2-step RACH is possible is indicated to the terminal 120 through the MIB, and parameters for selecting the random access type of the terminal 120 (that is, selecting one of the 2-step RACH and the 4-step RACH) may be provided to the terminal 120 through SIB 1.

3. Fallback to 4-Step RACH

After a cell search, the terminal 120 may perform the random access procedure. After the random access procedure, the 2-step RACH cannot be continued or there may be no actual profit in continuing the 2-step RACH. In this case, the BS or the terminal 120 may perform fallback from the 2-step RACH to the 4-step RACH. Hereinafter, operations of the BS or the terminal for fallback to the 4-step RACH are described with reference to FIGS. 15 to 17B.

Figure 15:
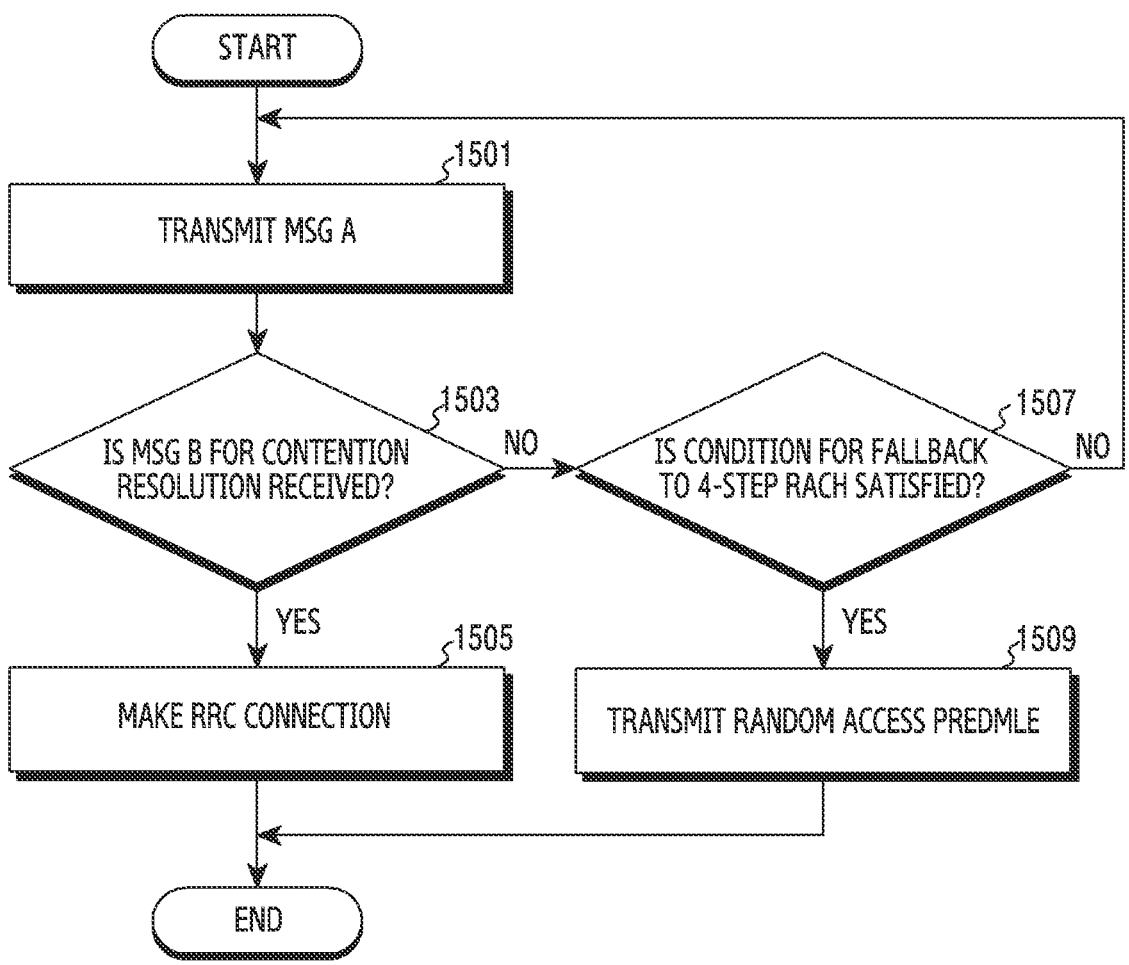
FIG. 15 is a flowchart illustrating the operation of the terminal for determining fallback to the 4-step RACH in a wireless communication system according to various embodiments of the disclosure. The determination about whether to perform fallback to the 4-step RACH is performed by the terminal.

FIG. 15 is a flowchart illustrating the operation of the terminal 120 for determining fallback to the 4-step RACH in a wireless communication system according to various embodiments of the disclosure. The determination about whether to perform fallback to the 4-step RACH may be performed by the terminal 120.

Referring to FIG. 15, in operation 1501, the terminal 120 may transmit message A. Message A may include a random access preamble through a PRACH and a terminal identifier through a PUSCH. According to an embodiment, in operation 1501, the terminal 120 may perform PUSCH retransmission of message A.

In operation 1503, the terminal 120 may determine whether message B for contention resolution is received. That is, the terminal 120 may determine whether information for the RRC connection setup is received. When message B for contention resolution is received, the terminal 120 may perform operation 1505. Since operation 1503 corresponds to operation 605 and operation 607 of FIG. 6, the same or similar description may be omitted. When message B for contention resolution is received, the terminal 120 may perform operation 1507.

In operation 1505, the terminal 120 may make the RRC connection. Since operation 1505 corresponds to operation 609 of FIG. 6, the same or similar description may be omitted.

In operation 1507, the terminal 120 may determine whether a condition for fallback to the 4-step RACH is satisfied. In some embodiments, the fallback condition may include a channel quality smaller than a threshold value. If the channel quality is smaller than the threshold value, a success probability of access attempt may decrease. In order to increase the access success probability, switching to the 4-step RACH may be performed.

In other embodiments, the fallback condition may include the number of retransmissions (including PUSCH retransmission) of message A larger than a predetermined threshold value. When uplink transmission according to the 2-step RACH procedure is repeated by the number of times corresponding to a predetermined value or larger, no more retransmission is performed and switching to the 4-step RACH may be performed.

In other embodiments, the fallback condition may include non-reception of message B by the terminal within a predetermined time. If message B according to the 2-step RACH procedure is not received within the predetermined time, the terminal may switch to the 4-step RACH.

In other embodiments, the fallback condition may include a power ramping counter having a maximum value. For example, the power ramping counter may be a power ramping counter for the PRACH. In another example, the power ramping counter may be a power ramping counter for the PUSCH. In another example, the power ramping counter may be a value for both the PRACH and the PUSCH. When the power ramping is maximum, the terminal 120 may switch to the 4-step RACH without additional power control.

If the fallback condition is satisfied, the terminal 120 may perform operation 1509. If the fallback condition is not satisfied, the terminal 120 may perform operation 1501 again.

In operation 1509, the terminal 120 may transmit a random access preamble. Transmission of the random access preamble may correspond to Msg 1 of the 4-step RACH. Thereafter, the BS 110 and the terminal 120 ma perform the random access procedure through signaling of Msg 2, Msg 3, and Msg 4.

Figure 16:
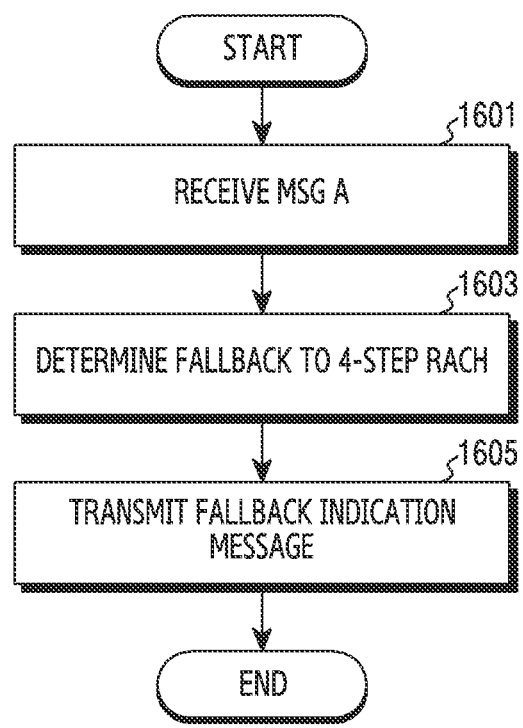
FIG. 16 is a flowchart illustrating the operation of the BS for determining fallback to the 4-step RACH in a wireless communication system according to various embodiments of the disclosure. The determination about whether to perform fallback to the 4-step RACH is performed by the BS.

FIG. 16 is a flowchart illustrating the operation of the BS 110 for determining fallback to the 4-step RACH in a wireless communication system according to various embodiments of the disclosure. The determination about whether to perform fallback to the 4-step RACH may be performed by the BS 110.

Referring to FIG. 16, in operation 1601, the BS 110 may receive message A. Transmission of message A may include PRACH transmission and PUSCH transmission. The BS 110 may perform PRACH detection and PUSCH decoding. The BS 110 may detect the random access preamble of the PRACH. The BS 110 may attempt PUSCH decoding when the random access preamble of the PRACH is detected. The BS 110 may succeed in PUSCH decoding or fail in PUSCH decoding.

In operation 1603, the BS 110 may determine fallback to the 4-step RACH. In some embodiments, the BS 110 may determine fallback to the 4-step RACH on the basis of the number of PUSCH retransmissions. This is because, if PUSCH retransmission is continuously repeated, the BS 110 may determine that uplink synchronization is unstable and thus stable access cannot be attempted. In other embodiments, if context of system information is changed, the BS 110 may determine fallback to the 4-step RACH. The system information may be an MIB or an SIB. For example, if SCS of message B (or Msg 2 or Msg 4) is changed, the BS 110 may determine fallback to the 4-step RACH.

In operation 1605, the BS 110 may transmit a fallback indication message to the terminal 120. The BS 110 may transmit a message indicating fallback to the 4-step RACH to the terminal 120.

In some embodiments, the fallback indication may be explicitly performed. The fallback indication may be performed on the basis of message B. For example, the BS 110 may insert a MAC control element (CE) indicating the fallback indication into MAC layer information of message B and transmit message B. In another example, the BS 110 may dynamically indicate fallback to the 4-step RACH through a specific field within the PDCCH of message B. At this time, for example, the PDCCH of message B may be DCI format 1_0. Control information of message B may include a fallback indicator as well as an uplink grant for Msg 3.

In other embodiments, the fallback indication may be implicitly performed. For example, if message B includes a TC-RNTI, message B may indicate fallback to the 4-step RACH. The terminal 120 may transmit Msg 3 on the basis of the TC-RNTI. In another example, if message B includes a TA, message B may indicate fallback to the 4-step RACH. The terminal 120 may transmit Msg 3 on the basis of a TA value. In another example, if a sequence index of the random access preamble is included in the PDSCH of message B, message B may indicate fallback to the 4-step RACH. The terminal 120 may transmit Msg 3.

Aspects of the fallback to the 4-step RACH may vary. In a first aspect, the terminal 120 may transmit Msg 3 of the 4-step RACH procedure after the fallback to the 4-step RACH. In a second aspect, the terminal 120 may perform transmission, starting at Msg 1 of the 4-step RACH procedure after the fallback to the 4-step RACH.

Since each of the two aspects of the fallback to the 4-step RACH includes at least one of random access preamble retransmission or PUSCH retransmission, a power control scheme may also be variously configured. Hereinafter, the operation of the terminal and the BS for power control after the fallback to the 4-step RACH and a power computing scheme are described with reference to FIGS. 17A and 17B.

Figure 17A:
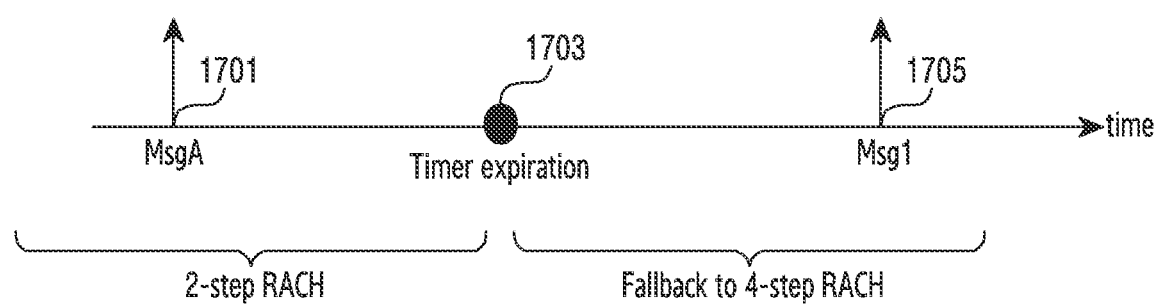
FIG. 17A illustrates an example of power control after fallback to the 4-step RACH in a wireless communication system according to various embodiments of the disclosure. After fallback to the 4-step RACH, retransmission starting at Msg 1 is described.

FIG. 17A illustrates an example of power control after fallback to the 4-step RACH in a wireless communication system according to various embodiments of the disclosure. After fallback to the 4-step RACH, retransmission starting at Msg 1 is described.

Referring to FIG. 17A, the terminal 120 may transmit message A at a time point 1751. Message A is a message including a random access preamble and terminal identity information in the 2-step RACH.

The terminal 120 may identify expiration of a timer at a time point 1753. The timer may be a fallback timer to the 4-step RACH. According to an embodiment, a value of the timer may be configured by SIB 1. According to another embodiment, the value of the timer may be preconfigured. If the terminal 120 does not receive message B until the timer expires, the terminal 120 may determine fallback to the 4-step RACH. The fallback to the 4-step RACH is determined in the state in which message B is not received, so that the terminal 120 may determine transmission starting at Msg 1 of the 4-step RACH. In another example, the terminal 120 may receive message B indicating fallback to the 4-step RACH at a time point 1753. In this case, message B includes an indicator indicating whether to continue the 2-step RACH procedure or perform fallback to the 4-step RACH to the terminal. The terminal 120 may determine fallback to the 4-step RACH on the basis of identification that received message B indicates fallback to the 4-step RACH.

The terminal 120 may transmit Msg 1 at a time point 1755. Msg 1 is a message including a random access preamble in the 4-step RACH.

Parameters related to computing of power of the random access preamble may be determined in various types. In some embodiments, a set of power computing parameters of Msg 1 of the 4-step RACH and a set of power computing parameters of the preamble of Msg A of the 2-step RACH may be configured independently from each other. Each parameter set may be configured as follows.

1) Parameter set for 2-step RACH={preambleReceivedTargetPower, DELTA_PREAMBLE, PREAMBLE_POWER_RAMPING_COUNTER, PREAMBLE_POWER_RAMPING_STEP}

2) Parameter set for 4-step RACH={preambleReceivedTargetPower, DELTA_PREAMBLE, PREAMBLE_POWER_RAMPING_COUNTER, PREAMBLE_POWER_RAMPING_STEP}

In some embodiments, power computing parameters of Msg 1 of the 4-step RACH and power computing parameters of the preamble of Msg A of the 2-step RACH may share one power parameter set. That is, the terminal 120 may configure the same power computing parameters regardless of a random access type. The shared power parameter set may be configured as follows.

Parameter set for 2&4-step RACH={preambleReceivedTargetPower, DELTA_PREAMBLE, PREAMBLE_POWER_RAMPING_COUNTER, PREAMBLE_POWER_RAMPING_STEP}

In other embodiments, some of the power computing parameters for the random access preamble may include a common parameter set used in common for both the 4-step RACH and the 2-step RACH, some thereof may include a 4-step RACH-specific parameter set defined only for the 4-step RACH, and some thereof may include a 2-step RACH-specific parameter set defined only for the 2-step RACH. According to an embodiment, parameters other than the ramping counter of the random access preamble may be shared between the 4-step RACH and the 2-step RACH. For example, each parameter set may be configured as follows.

1) Parameter set for 2&4-step RACH={preambleReceivedTargetPower, DELTA_PREAMBLE, PREAMBLE_POWER_RAMPING_COUNTER, PREAMBLE_POWER_RAMPING_STEP}

2) Parameter for 2-step: PREAMBLE_POWER_RAMPING_COUNTER

3) Parameter for 4-step: PREAMBLE_POWER_RAMPING_COUNTER

According to various embodiments, power of the random access preamble may be determined on the basis of the parameter set and the following equation.

$$P_{PRACH,b,f,c}(i)=\min\{P_{CMAX,f,c}(i), P_{PRACH,target,f,c}+PL_{b,f,c}\} \quad \text{Equation 2}$$

$P_{PRACH,b,f,c}$ (i) denotes transmission power of the random access preamble in RACH occasion i, UL BWP b, carrier f, and serving cell C $P_{PRACH,target,f,c}$ may be determined by the following equation.

$$\begin{aligned}&\text{PREAMBLE\_RECEIVED\_TARGET\_POWER}\\&\quad(\text{PPRACH,target},f,c)=\text{preambleReceivedTarget-}\\&\quad\text{Power}+\text{DELTA\_PREAMBLE}+(\text{PREAMBLE\_}\\&\quad\text{POWER\_RAMPING\_COUNTER}-1)\times\text{PRE-}\\&\quad\text{AMBLE\_POWER\_RAMPING\_STEP}\end{aligned} \quad \text{Equation 3}$$

Figure 17B:
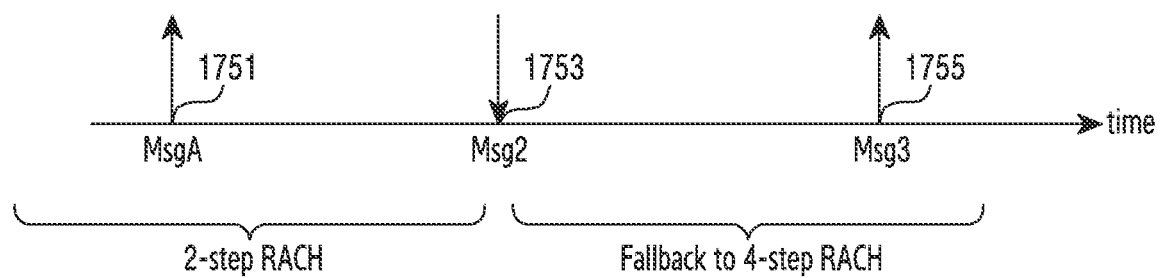
FIG. 17B illustrates another example of power control after fallback to the 4-step RACH in a wireless communication system according to various embodiments of the disclosure. After fallback to the 4-step RACH, retransmission starting at Msg 3 is described.

FIG. 17B illustrates another example of power control after fallback to the 4-step RACH in a wireless communication system according to various embodiments of the disclosure. After fallback to the 4-step RACH, retransmission starting at Msg 3 is described.

Referring to FIG. 17B, the terminal 120 may transmit message A at a time point 1701. Message A is a message including a random access preamble and terminal identity information in the 2-step RACH.

The terminal 120 may receive Msg 2 of the 4-step RACH at a time point 1703. In some embodiments, transmission of Msg 2 may indicate fallback to the 4-step RACH. The terminal 120 may receive a message including a TC-RNTI, a TA, and a random access preamble. The terminal 120 may determine fallback to the 4-step RACH on the basis of identification that the received message is Msg 2. Meanwhile, transmission of Msg 2 may indicate successful detection of the random access preamble by the BS 110. This is because transmission of Msg 2 is a response to the random access preamble. Accordingly, the terminal 110 may not transmit Msg 1 in spite of the fallback to the 4-step RACH.

The terminal 120 may transmit Msg 3 at a time point 1705. Msg 3 may correspond to a procedure of transmitting identity information of the terminal 120 in the 4-step RACH. The terminal 120 may perform a UE-specific scrambling using the C-RNTI or the TC-RNTI received from Msg 2. The terminal 120 may perform uplink synchronization on the basis of the TA of Msg 2 and transmit Msg 3.

Parameters related to computing of power of the random access preamble may be determined in various types. The transmission of Msg 3 includes PUSCH transmission and PUSCH power computing parameter sets are defined.

In some embodiments, a Msg 3 power computing parameter set of the 4-step RACH and a PUSCH power computing parameter set of Msg A of the 2-step RACH may be configured independently from each other. Each parameter set may be configured as follows.

1) Parameter set for 2-step RACH={preambleReceivedTargetPower, DELTA_PUSCH, alpha, delta TF,PREAMBLE_POWER_RAMPING_COUNTER, PREAMBLE_POWER_RAMPING_STEP}

2) Parameter set for 4-step RACH={preambleReceivedTargetPower, DELTA_PREAMBLE, PREAMBLE_POWER_RAMPING_COUNTER, PREAMBLE_POWER_RAMPING_STEP}

In other embodiments, power computing parameters of Msg 3 of the 4-step RACH and power computing parameters of the PUSCH of Msg A of the 2-step RACH may share one power parameter set. That is, the terminal 120 may configure the same power computing parameters regardless of a random access type. The shared power parameter set may be configured as follows.

Parameter set for 2&4-step RACH={preambleReceivedTargetPower, DELTA_PUSCH, alpha, delta TF,PREAMBLE_POWER_RAMPING_COUNTER, PREAMBLE_POWER_RAMPING_STEP}

In other embodiments, some of the power computing parameters for the random access preamble may include a common parameter set used in common for both the 4-step RACH and the 2-step RACH, some thereof may include a 4-step RACH-specific parameter set defined only for the 4-step RACH, and some thereof may include a 2-step RACH-specific parameter set defined only for the 2-step RACH. According to an embodiment, parameters other than the ramping counter of the random access preamble may be shared between the 4-step RACH and the 2-step RACH. For example, each parameter set may be configured as follows.

1) Parameter set for 2&4-step RACH={preambleReceivedTargetPower, DELTA_PUSCH, alpha, delta_TF, PREAMBLE_POWER_RAMPING_STEP}

2) Parameter for 2-step: PREAMBLE_POWER_RAMPING_COUNTER

3) Parameter for 4-step: PREAMBLE_POWER_RAMPING_COUNTER

According to various embodiments, PUSCH transmission power may be determined on the basis of the parameter sets and the following equation in the random access procedure.

$$P_{PUSCH}(i) = \max\left( P_{CMAX}, preambleReceivedTargetPower + \Delta_{PUSCH} + \log_{10}(2^\mu M_{RB}^{PUSCH}(i)) + \alpha PL(i) + \Delta_{TF}(i) + f(0, l) \right)$$

Equation 4

$P_{PUSCH}(i)$ denotes PUSCH transmission power in transmission occasion i and PCMAX denotes maximum transmission power the terminal. $\Delta_{PUSCH}$ is indicated by DELTA_PUSCH, α is alpha, and $\Delta_{TF}$ is indicated by delta_TF. $M_{RB}^{PUSCH}$ denotes the number of RBs allocated to the PUSCH.

$f(0,1) = \Delta rampup + \delta_{msg2}$

Equation 5

$\delta_{msg2}$ is a TCP included in Msg 2 in the case of the 4-step RACH and is 0 in the case of the 2-step RACH. Δrampup may be determined by the following equation.

$$\Delta_{rampup}(i) = \min\left[\left\{\max\left(0, P_{CMAX} - \left(\begin{array}{c}10\log_{10}(2^\mu M_{RB}^{PUSCH}(i)) + \\ preambleReceivedTargetPower + \\ \Delta_{PUSCH} + \alpha PL(i) + \Delta_{TF}(i)\end{array}\right)\right)\right\}, \Delta_{rampuprequested}\right]$$

Equation 6

$\Delta_{rampuprequested} =$ (PREAMBLE_POWER_RAMPING_COUNTER − 1) × PREAMBLE_POWER_RAMPING_STEP Equation 7

In fallback to the 4-step RACH, transmission of Msg 3 may include PUSCH retransmission. This is because the terminal identifier was not normally provided. Since PUSCH transmission after fallback to the 4-step RACH is transmission after transmission of message A of the 2-step RACH, it may be retransmission. Not only power control but also an encoding scheme may be changed. That is, in retransmission, there may be different payload.

In PUSCH retransmission, the RV may be variously configured. According to an embodiment, the RV of the PUSCH of first transmission of Msg 3 after fallback may have a fixed value (for example, RV0). According to another embodiment, the RV of the PUSCH may be indicated according to a field of control information of message B or Msg 2. According to another embodiment, the RV of the PUSCH may be determined according to an RV pattern order by RACH configuration information. For example, the RV pattern sequentially corresponds to {0, 2, 3, 1}, and the RV of first PUSCH transmission after the 4-step RACH may be RV1 when the RV of PUSCH transmission before fallback to the 4-step RACH is RV3.

V. UE capability

Figure 18:
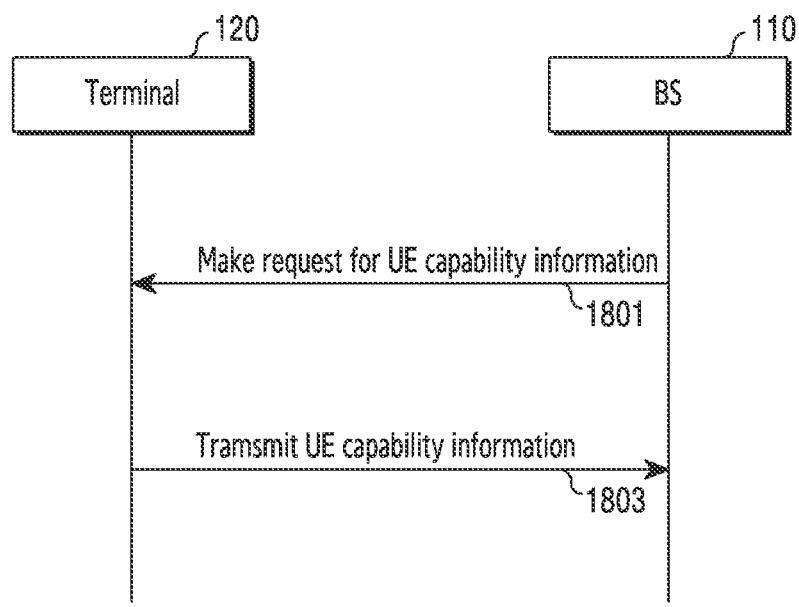
FIG. 18 illustrates signaling for UE capability information for the 2-step RACH procedure in a wireless communication system according to various embodiments of the disclosure.

FIG. 18 illustrates signaling for UE capability information for the 2-step RACH procedure in a wireless communication system according to various embodiments of the disclosure.

Referring to FIG. 18, in operation 1801, the BS 110 may transmit a UE capability information request message to the terminal 120. In operation 1803, the terminal 120 may transmit UE capability information to the BS 110. The UE capability information may include information indicating whether the 2-step RACH can be supported. For example, information indicating whether the 2-step RACH can be supported may be implemented by 1-bit information. If the corresponding bit is 1, {supported} may be indicated.

When the terminal 120 supports the 2-step RACH, the BS 110 may transmit a configuration for the 2-step RACH to the terminal 120. The BS 110 may transmit an indication related to the performance of the 2-stepr RACH of the terminal 120 to the terminal 120. On the other hand, if the terminal 120 does not support the 2-step RACH, the BS 110 may not transmit the configuration for the 2-step RACH and the indication related to the performance of the 2-step RACH to the terminal 120.

In the disclosure, the operations of the BS/terminal for configuring the 2-step RACH have been described with reference to FIGS. 1 to 18 through subdivision of a design of transmitted information, the operation of the BS and the terminal corresponding thereto, and signaling of the BS and the terminal Respective embodiments can be individually applied or a combination thereof may be applied. That is, it is not interpreted that the terminal operation in a specific figure excludes the terminal operation in another figure. For example, the operation for determining whether PUSCH transmission is successful (for example, FIG. 7) may be combined with the fallback operation (for example, FIG. 16) and the combined operations may be performed. For example, the description for configuration information by the 2-step RACH may be executed along with the operation of retransmission of msg A (for example, FIG. 8).

In the disclosure, the RSRP of the SSB has been described as an example of metric for measuring the channel quality of the signal of the BS, but various indexes can be used. In addition to the RSRP, other terms having the equivalent technical meaning such as beam reference signal received power (BRSRP), reference signal received quality (RSRQ), received signal strength indicator (RSSI), signal to interference and noise ratio (SINR), carrier to interference and noise ratio (CINR), SNR, error vector magnitude (EVM), bit error rate (BER), and block error rate (BLER) or other metric indicating the channel quality may be used.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   receiving, from a base station, configuration information, wherein the configuration information includes information on a supplementary uplink (SUL) threshold value and information on a threshold value for 2-step random access;
   identifying whether a reference signal received power (RSRP) of downlink path loss is smaller than the SUL threshold value;
   selecting an SUL carrier for performing a random access procedure in case that the RSRP is smaller than the SUL threshold value;
   selecting a normal uplink (NUL) carrier for performing the random access procedure in case that the RSRP is larger than or equal to the SUL threshold value; and
   after the selecting of the SUL carrier or the NUL carrier,
      identifying whether the RSRP is larger than the threshold value for a 2-step random access,
      determining a random access type as the 2-step random access in case that the RSRP is larger than the threshold value, and
      determining the random access type as a 4-step random access in case that the RSRP is not larger than the threshold value.

2. The method of claim 1, wherein the configuration information is received through system information block (SIB) 1.

3. The method of claim 1,
   wherein the 4-step random access is associated with 4 steps of transmission of a random access preamble of a physical random access channel (PRACH), reception of a random access response (RAR), transmission of a physical uplink shared channel (PUSCH) including terminal identity, and reception of a contention resolution message, and
   wherein the 2-step random access is associated with 2 steps of transmission of a message A including a random access preamble of the PRACH and a physical uplink shared channel (PUSCH) and reception of a message B including the random access response (RAR).

4. The method of claim 3, wherein the configuration information includes information on a message B window indicating a number of slots for receiving the message B.

5. The method of claim 3, further comprising:
   in case that a number of transmissions of the message A is a predetermined value, determining the random access type to the 4-step random access from the 2-step random access,
   wherein the configuration information includes information on the predetermined value.

6. The method of claim 3, further comprising:
in case that the random access type is configured as the 2-step random access, transmitting the message A to the base station;
receiving the message B from the base station in response to the message A;
in case that the message B indicates fallback in a medium access control (MAC) layer, performing an uplink transmission corresponding to message 3 (Msg3) of the 4-step random access, wherein the message B comprises an identifier (ID) of the random access preamble and an uplink grant for the uplink transmission; and
in case that the message B indicates a success of the random access procedure, identifying the success of the random access procedure, wherein the message B comprises a contention resolution identity.

7. The method of claim 3,
wherein the configuration information comprises at least one of:
an index for a PRACH configuration of the message A;
information on a number of transmissions of the PRACH of the message A frequency-division multiplexed in one transmission instance;
information on an offset of the message A in a frequency domain for physical resource block (PRB) 0;
information on a cyclic shift (CS) configuration for a preamble included in the message A;
information on a power ramping step of the message A;
information on a target power level of transmission of the random access preamble of the message A; or
information on a length of a window for receiving the message B of the 2-step random access in response to the message A, and
wherein the index for the PRACH configuration indicates a preamble format, a number of PRACH occasions in a PRACH slot in a time domain, and a PRACH duration, and the length of the window is expressed by a number of slots.

8. The method of claim 3, wherein the configuration information comprises at least one of:
information on a number of synchronization signal (SS)/physical broadcast channel (PBCH) blocks (SSBs) per RACH occasion and a number of preambles per SSB in the 2-step random access;
information on preamble grouping in the 2-step random access;
information on a length of a sequence for generating the random access preamble of the message A; or
information on a subcarrier spacing of the message A.

9. The method of claim 3,
wherein the configuration information comprises a configuration associated with a transmission of the PUSCH, and
wherein the configuration associated with the transmission of the PUSCH of the message A comprises at least one of:
information on whether a transform precoder of the message A is activated;
information on a modulation and coding scheme (MCS) of the message A;
information on resource allocation of the PUSCH of the message A;
information associated with a frequency hopping of the message A; or
configuration information for a demodulation reference signal (DMRS) of the message A.

10. A method performed by a base station (BS) in a wireless communication system, the method comprising:
generating configuration information for 2-step random access; and
transmitting the configuration information to a terminal, wherein the configuration information includes:
information on a supplementary uplink (SUL) threshold value for selecting a carrier for performing a random access procedure by comparing a reference signal received power (RSRP) of downlink path loss with the SUL threshold value, the selected carrier being one of a supplementary uplink (SUL) carrier or a normal uplink (NUL) carrier, and
information on a threshold value for configuring a random access type,
wherein the random access type is configured as a 2-step random access in case that the RSRP is larger than the threshold value,
wherein the random access type is configured as a 4-step random access in case that the RSRP is not larger than the threshold value, and
wherein the random access type is configured as the 2-step random access or the 4-step random access after one of the SUL carrier or the NUL carrier is selected.

11. The method of claim 10, wherein the configuration information is transmitted through system information block (SIB) 1.

12. The method of claim 10,
wherein the 4-step random access is associated with 4 steps of transmission of a random access preamble of a physical random access channel (PRACH), reception of a random access response (RAR), transmission of a physical uplink shared channel (PUSCH) including terminal identity, and reception of a contention resolution message, and
wherein the 2-step random access is associated with 2 steps of transmission of a message A including a random access preamble of the PRACH and a physical uplink shared channel (PUSCH) and reception of a message B including the random access response (RAR).

13. The method of claim 12, wherein the configuration information includes information on a message B window indicating a number of slots for receiving the message B.

14. The method of claim 12,
wherein the configuration information comprises information on a predetermined value of a number of transmissions of the message A, and
wherein the predetermined value is used to configure the random access type to the 4-step random access from the 2-step random access in case that the number of transmissions of the message A is the predetermined value.

15. The method of claim 12, further comprising:
in case that the random access type is configured as the 2-step random access
receiving, from the terminal, the message A to the base station;
transmitting, to the terminal, the message B in response to the message A; and
receiving, from the terminal, uplink transmission corresponding to message 3 (Msg3) of the 4-step random access in case that the message B indicates fallback in a medium access control (MAC) layer,
wherein the message B comprises an identifier (ID) of the random access preamble and an uplink grant for the uplink transmission, and wherein the message B comprises a contention resolution identity in case that the message B indicates a success of the random access procedure.

16. The method of claim 12,
wherein the configuration information comprises at least one of:
an index for a PRACH configuration of the message A;
information on a number of transmissions of the PRACH of the message A frequency-division multiplexed in one transmission instance;
information on an offset of the message A in a frequency domain for physical resource block (PRB) 0;
information on a cyclic shift (CS) configuration for a preamble included in the message A;
information on a power ramping step of the message A;
information on a target power level of transmission of the random access preamble of the message A; or
information on a length of a window for receiving the message B of the 2-step random access in response to the message A, and
wherein the index for the PRACH configuration indicates a preamble format, a number of PRACH occasions in a PRACH slot in a time domain, and a PRACH duration, and the length of the window is expressed by a number of slots.

17. The method of claim 12, wherein the configuration information comprises at least one of:
information on a number of synchronization signal (SS)/physical broadcast channel (PBCH) blocks (SSBs) per RACH occasion and a number of preambles per SSB in the 2-step random access;
information on preamble grouping in the 2-step random access;
information on a length of a sequence for generating the random access preamble of the message A; or
information on a subcarrier spacing of the message A.

18. The method of claim 12, wherein the configuration information comprises a configuration associated with a transmission of the PUSCH, and the configuration associated with the transmission of the PUSCH of the message A comprises at least one piece of:
information on whether a transform precoder of the message A is activated;
information on a modulation and coding scheme (MCS) of the message A;
information on resource allocation of the PUSCH of the message A;
information associated with a frequency hopping of the message A; or
configuration information for a demodulation reference signal (DMRS) of the message A.

19. A terminal in a wireless communication system, the terminal comprising:
at least one transceiver; and
at least one processor,
wherein the at least one processor is configured to:
receive, from a base station, configuration information, wherein the configuration information includes information on a supplementary uplink (SUL) threshold value and information on a threshold value for 2-step random access,
identify whether a reference signal received power (RSRP) of downlink path loss is smaller than the SUL threshold value,
select an SUL carrier for performing a random access procedure in case that the RSRP is smaller than the SUL threshold value,
select a normal uplink (NUL) carrier for performing the random access procedure in case that the RSRP is larger than or equal to the SUL threshold value, and
after the selection of the SUL carrier or the NUL carrier,
identify whether the RSRP is larger than the threshold value for a 2-step random access,
determine a random access type as the 2-step random access in case that the RSRP is larger than the threshold value, and
configure-determine the random access type as a 4-step random access in case that the RSRP is not larger than the threshold value.

20. A base station (BS) in a wireless communication system, the BS comprising:
at least one transceiver; and
at least one processor, wherein the at least one processor is configured to:
generate configuration information for 2-step random access, and
transmit the configuration information to a terminal,
wherein the configuration information includes:
information on a supplementary uplink (SUL) threshold value for selecting a carrier for performing a random access procedure by comparing a reference signal received power (RSRP) of downlink path loss with the SUL threshold value, the selected carrier being one of a supplementary uplink (SUL) carrier or a normal uplink (NUL) carrier, and
information on a threshold value for configuring a random access type,
wherein the random access type is configured as a 2-step random access in case that the RSRP is larger than the threshold value,
wherein the random access type is configured as a 4-step random access in case that the RSRP is not larger than the threshold value, and
wherein the random access type is configured as the 2-step random access or the 4-step random access after one of the SUL carrier or the NUL carrier is selected.

* * * * *